US010215117B2

(12) United States Patent
Ueda

(10) Patent No.: US 10,215,117 B2
(45) Date of Patent: Feb. 26, 2019

(54) WORK VEHICLE

(71) Applicant: Yanmar Co., Ltd., Osaka-shi, Osaka (JP)

(72) Inventor: Ryouhei Ueda, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 112 days.

(21) Appl. No.: 15/306,955

(22) PCT Filed: Jul. 22, 2015

(86) PCT No.: PCT/JP2015/070837
§ 371 (c)(1),
(2) Date: Oct. 26, 2016

(87) PCT Pub. No.: WO2016/013578
PCT Pub. Date: Jan. 28, 2016

(65) Prior Publication Data
US 2017/0045009 A1 Feb. 16, 2017

(30) Foreign Application Priority Data

Jul. 24, 2014 (JP) .................... 2014-150393
Jul. 24, 2014 (JP) .................... 2014-150394
Jul. 24, 2014 (JP) .................... 2014-150395

(51) Int. Cl.
*B60W 30/188* (2012.01)
*F02D 41/02* (2006.01)
(Continued)

(52) U.S. Cl.
CPC .......... *F02D 41/0215* (2013.01); *B60K 17/08* (2013.01); *B60K 17/28* (2013.01);
(Continued)

(58) Field of Classification Search
None
See application file for complete search history.

(56) References Cited

U.S. PATENT DOCUMENTS 4,086,532 A * 4/1978 Aronson .................... G01P 1/08
  324/161
4,747,301 A * 5/1988 Bellanger ................ G07C 5/08
  73/114.53
(Continued)

FOREIGN PATENT DOCUMENTS

JP 06-153612 6/1994
JP H06-153612 A 6/1994
(Continued)

OTHER PUBLICATIONS

International Search Report dated Oct. 20, 2015, for International Application No. PCT/JP2015/070837, ISA/JPO, Tokyo, Japan.
(Continued)

*Primary Examiner* — Justin Holmes
(74) *Attorney, Agent, or Firm* — Norton Rose Fulbright US LLP

(57) ABSTRACT

In a work vehicle according to the present invention, a control device calculates, for each of a plurality of speed-changing stages in a PTO transmission, an expected maximum rotational speed of PTO rotary power that is output from the PTO shaft when an engine rotational speed changing operation member is operated to a maximum extent, and shows, in a listed manner, the calculated results in a liquid crystal display part of a display device. The present invention can inform an operator of the maximum rotational speed of PTO rotary power that is output from the PTO shaft for each speed-changing stage in the PTO transmission without performing a speed changing operation on the PTO transmission.

7 Claims, 16 Drawing Sheets

(51) Int. Cl.
*B60K 17/28* (2006.01)
*B60K 23/00* (2006.01)
*B60K 35/00* (2006.01)
*B60R 1/00* (2006.01)
*B62D 49/06* (2006.01)
*F02D 41/04* (2006.01)
*F02D 41/30* (2006.01)
*F16H 63/50* (2006.01)
*F02D 31/00* (2006.01)
*B60K 17/08* (2006.01)
*B60K 37/02* (2006.01)
*A01B 63/00* (2006.01)
*B60W 50/14* (2012.01)
*F16H 59/68* (2006.01)
*F16H 61/02* (2006.01)
*F16H 63/42* (2006.01)

(52) U.S. Cl.
CPC ............. *B60K 23/00* (2013.01); *B60K 35/00* (2013.01); *B60K 37/02* (2013.01); *B60R 1/00* (2013.01); *B60W 30/1888* (2013.01); *B62D 49/0692* (2013.01); *F02D 31/007* (2013.01); *F02D 41/021* (2013.01); *F02D 41/04* (2013.01); *F02D 41/3005* (2013.01); *F16H 63/50* (2013.01); *A01B 63/008* (2013.01); *B60K 2350/1064* (2013.01); *B60R 2300/207* (2013.01); *B60W 2050/146* (2013.01); *B60Y 2200/221* (2013.01); *B60Y 2300/1888* (2013.01); *F16H 2059/6815* (2013.01); *F16H 2061/0218* (2013.01); *F16H 2063/426* (2013.01)

(56) References Cited

U.S. PATENT DOCUMENTS

| | | | |
|---|---|---|---|
| 5,971,888 A | 10/1999 | Goode | |
| 2006/0183599 A1* | 8/2006 | Steen | B60K 25/00 477/166 |
| 2009/0187316 A1* | 7/2009 | Romine | B60K 17/28 701/51 |
| 2010/0191404 A1* | 7/2010 | Ishikawa | B60K 35/00 701/31.4 |
| 2014/0067198 A1* | 3/2014 | Togo | B60K 25/06 701/33.7 |

FOREIGN PATENT DOCUMENTS

| | | |
|---|---|---|
| JP | 2006-123724 A | 5/2006 |
| JP | 2006-299902 A | 11/2006 |
| JP | 2010-017156 A | 1/2010 |
| JP | 2012-246900 A | 12/2012 |
| JP | 2013-236556 A | 11/2013 |
| JP | 2014-029215 A | 2/2014 |

OTHER PUBLICATIONS

European search report dated Jan. 12, 2018 issued in corresponding EP Application 15824925.0 cites the patent documents above.

* cited by examiner

WORK VEHICLE

FIELD OF THE INVENTION

The present invention relates to a work vehicle, such as a tractor and a rice transplanter, equipped with a display device that shows information to an operator.

BACKGROUND ART

In utility vehicles such as tractors, it is conventional to provide a liquid crystal display part in an instrument panel that has a tachometer for indicating the rotational speed of an engine and various indicator lamps and show various information in the liquid crystal display part.

For example, Patent Document 1 below discloses a work vehicle including an engine, a speed control lever operated to change the output rotational speed of the engine, a main transmission and an auxiliary transmission that change the speed of rotary power from the engine, a main shift lever and an auxiliary shift lever respectively operated to change the speed-changing status of the main transmission and the auxiliary transmission, an instrument panel including the liquid crystal display part, and a control device, wherein an actual vehicle speed based on a speed sensor, the current speed-changing status (the activated speed-changing stage) of the main transmission expressed using the vehicle speed attained when the engine is at a rated rotational speed (a rated vehicle speed) at the current operational position of the main shift lever, the current speed-changing status (the activated speed-changing state) of the auxiliary transmission, and a set vehicle speed based on the current rotational speed (a set rotational speed) of the engine obtained from the operational position of the speed control lever are shown in parallel on the liquid crystal display part.

With the configuration described in Patent Document 1, an operator can recognize the actual vehicle speed, the activated speed-changing stage of the main transmission, the activated speed-changing stage of the auxiliary transmission, and the set vehicle speed merely by looking at the liquid crystal display part of the instrument panel without directly looking at the operational states (the operational positions) of the speed control lever, the main shift lever, and the auxiliary shift lever.

However, in the configuration described in Patent Document 1, what is shown in the liquid crystal display part is information relating only to the vehicle speed at that time.

That is, the configuration described in Patent Document 1 is for showing the vehicle speed at that time obtained based on the activated speed-changing stage of the main transmission at that time, the activated speed-changing stage of the auxiliary transmission at that time, and the output rotational speed of the engine at that time, and is not for informing an operator in advance of how the set vehicle speed and the actual vehicle speed change in accordance with operations on the speed control lever, the main shift lever, and/or the auxiliary shift lever.

Work vehicles such as tractors are provided with a working-system power transmission path that transmits rotary power from an engine to a PTO shaft via a PTO transmission in addition to a traveling-system power transmission path that transmits rotary power from the engine to travel members such as driving wheels via a main transmission and an auxiliary transmission.

The rotary power that is output from the PTO shaft serves as power to drive a working device such as a rotary tiller, and an operator changes speed-changing stage of the PTO transmission via a PTO shift lever in accordance with the activating state of the working device to cause an output rotational speed suitable for the activating state at that time to be output from the PTO shaft.

However, there is no conventional work vehicle that is configured to inform in advance an operator of how the output rotational speed of the PTO shaft changes when the PTO transmission is activated or operated to change the output rotational speed thereof.

That is, with conventional work vehicles, when an operator, judging from the activating or operating state of the working device, wishes to increase the output rotational speed of the PTO shaft, the operator has to determine from his own knowledge and experience how far the output rotational speed of the PTO shaft increases when the PTO transmission is shifted to a higher speed-changing stage.

Accordingly, in some cases, the operator needs to repeat actually shifting the PTO transmission toward a higher speed side, for example, for only one speed-changing stage, then checking the activating state of the working device, and judging whether it is still necessary to shift the PTO transmission.

PRIOR ART DOCUMENT

Patent Document

Patent Document 1: Japanese Unexamined Patent Publication No. 2014-029215

DISCLOSURE OF THE INVENTION

The present invention has been conceived in view of such conventional art, and an object of the present invention is to provide a work vehicle capable of changing the speed of PTO rotary power transmitted from an engine to a PTO shaft by a multi-stage PTO transmission, wherein an operator can be informed of the maximum rotational speed of PTO rotary power that is output from the PTO shaft for each speed-changing stage in the PTO transmission without performing a speed changing operation on the PTO transmission.

In order to achieve the object, the present invention provides a work vehicle including an engine configured to output power that has a rotational speed corresponding to an operation on an engine rotational speed changing operation member, a traveling-system transmission disposed in a traveling-system power transmission path from the engine to travel members and configured to perform a speed change action corresponding to an operation on a traveling-system speed changing operation member, a multi-stage PTO transmission disposed in an working-system power transmission path from the engine to a PTO shaft and configured to perform a speed change action corresponding to an operation on a PTO speed changing operation member, a display device having a liquid crystal display part, and a control device, wherein the control device calculates, for each of a plurality of speed-changing stages in the PTO transmission, an expected maximum rotational speed of PTO rotary power that is output from the PTO shaft when the engine rotational speed changing operation member is operated to a maximum extent, and shows the calculated results in the liquid crystal display part in a listed manner.

The work vehicle according to the present invention makes it possible to inform an operator of the maximum rotational speed of PTO rotary power that is output from the PTO shaft for each speed-changing stage in the PTO transmission without performing a speed changing operation on the PTO transmission, since the control device is configured to calculate, for each of a plurality of speed-changing stages in the PTO transmission, the expected maximum rotational speed of PTO rotary power that is output from the PTO shaft when the engine rotational speed changing operation member is operated to a maximum extent, and shows the calculated results in the liquid crystal display part in a listed manner. Accordingly, the work device can realize that the PTO shaft outputs the rotational power having rotational speed suitable for the activating or working state at that time to enhance work efficiency.

The work vehicle according to the present invention may further include an engine rotational speed upper limit setting member and a traveling-mode switching operation member.

In this configuration, the control device stores a plurality of engine rotational speed upper limit values that are set by the engine rotational speed upper limit setting member, is configured such that, in a state in which an output rotational speed of the engine when the engine rotational speed changing operation member is operated to a maximum extent is limited to one engine rotational speed upper limit value that is made effective by the traveling-mode switching operation member, the control device activates and controls a fuel injection device that supplies fuel to the engine to cause an output rotational speed of the engine to arrive at a rotational speed corresponding to an amount of operation on the engine rotational speed changing operation member, and calculates the expected maximum rotational speed of PTO rotary power for each speed-changing stage in the PTO transmission based on the effective engine rotational speed upper limit.

The work vehicle according to the present invention may further include a PTO clutch that is disposed in the working-system power transmission path and connects and disconnects power from the engine to the PTO shaft in response to an operation on a PTO ON-OFF operation member.

In this configuration, the control device may be configured to cause the liquid crystal display part to shift to a PTO rotational speed display screen that shows the expected maximum rotational speeds of PTO rotational power of respective speed-changing stages in the PTO transmission in a listed manner, in response to ON operation on the PTO ON-OFF operation member.

The work vehicle according to the present invention may further include a display switching operation member that is capable of being manually operated.

In this configuration, the control device may be configured to cause the liquid crystal display part to shift to a PTO rotational speed display screen that shows the expected maximum rotational speeds of PTO rotational power of respective speed-changing stages in the PTO transmission in a listed manner, in response to a predetermined operation on the display switching operation member.

The work vehicle according to the present invention may further include a PTO rotational speed sensor that detects an actual rotational speed of the PTO shaft.

In this configuration, the control device may be configured to cause the liquid crystal display part to also show the actual rotational speed of the PTO shaft based on the PTO rotational speed sensor when showing the expected maximum rotational speeds of PTO rotational power of respective speed-changing stages in the PTO transmission.

EMBODIMENT FOR CARRYING OUT THE INVENTION

First Embodiment

Figure 1:
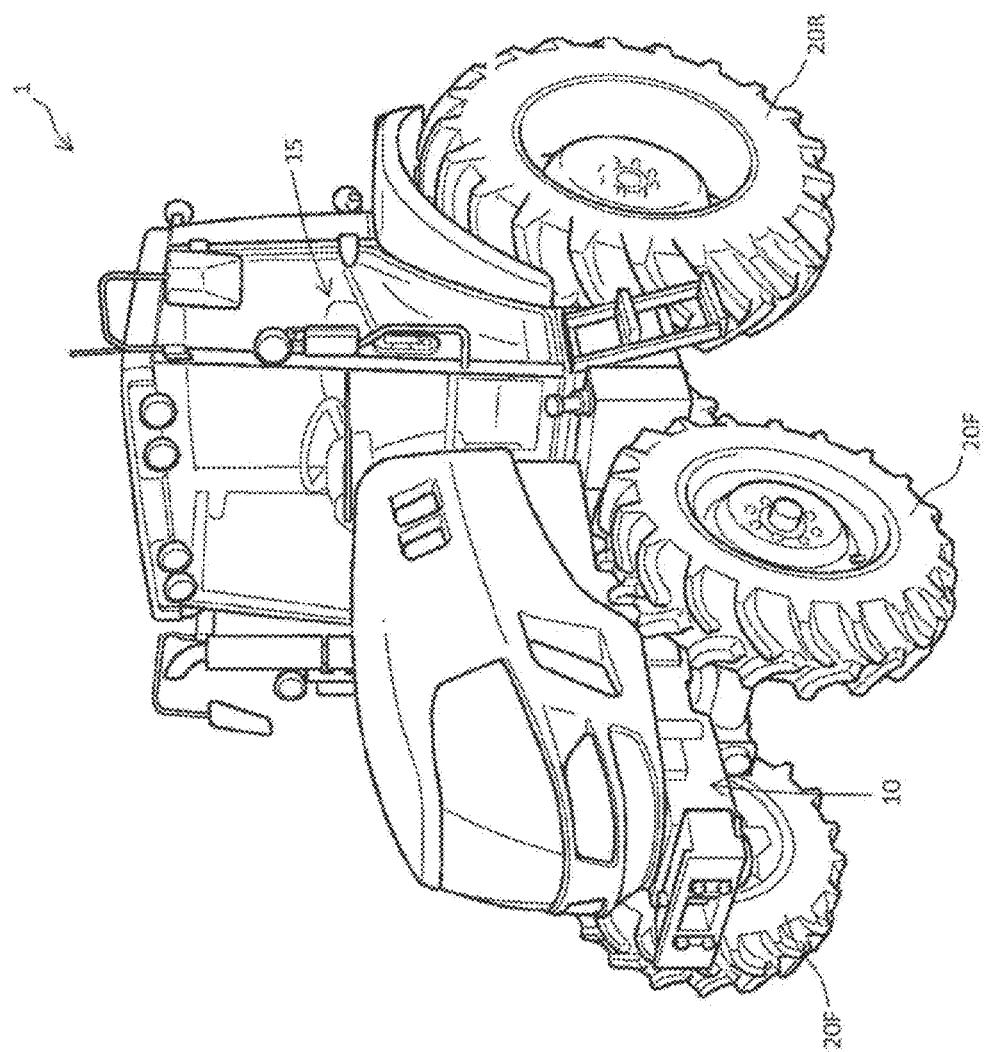
FIG. 1 is a perspective view of a work vehicle according to a first embodiment of the present invention.

Below, a preferable embodiment of the work vehicle of the present invention will now be described with reference to the appended drawings.

FIGS. 1 to 4 respectively show a perspective view, a rear view, a plan view, and a schematic power transmission diagram of a work vehicle 1 of this embodiment.

As shown in FIGS. 1 to 4, the work vehicle 1 of this embodiment is in the form of a tractor.

Specifically, as shown in FIGS. 1 to 4, the work vehicle 1 has a vehicle frame 10, a driver's seat 15 supported by the vehicle frame 10, an engine 50 supported by the vehicle frame 10, a pair of right and left front wheels 20F, a pair of right and left rear wheels 20R, a traveling-system power transmission structure 60 that transmits rotary power from the engine 50 to driving wheels, a PTO shaft 95 that outputs rotary power to outside, a PTO-system power transmission structure 80 that transmits rotary power from the engine 50 to the PTO shaft 95, a control device 100, and a fuel injection device 40 (see FIG. 5 below) that injects fuel into the engine 50.

Figure 5:
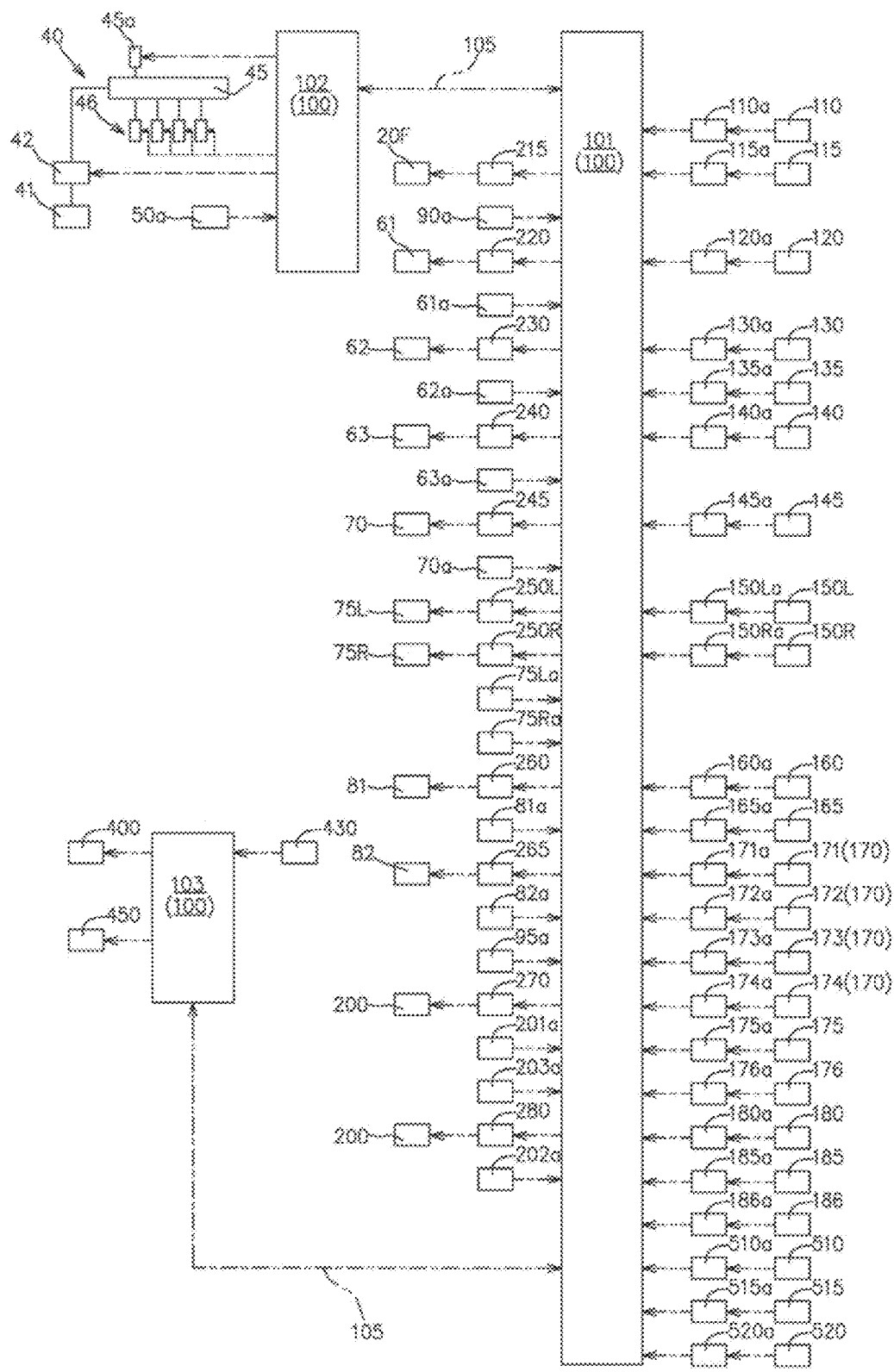
FIG. 5 is a control block diagram in the work vehicle.

FIG. 5 shows a control block diagram of the control device 100.

As shown in FIG. 5, in this embodiment, the control device 100 has a plurality of controllers such as a main-machine controller 101, an engine controller 102, and a meter controller 103.

Corresponding sensors and actuators are electrically connected to the controllers 101, 102, and 103, and the controllers 101, 102, and 103 are electrically connected to each other via CAN communication buses 105.

The controllers 101, 102, and 103 are each provided with a processing part (hereinafter referred to as a CPU) including a control processing means for performing computation based on signals input from various sensors and the like; and a memory part including, for example, a ROM that stores a control program, control data, and the like, an EEPROM that can keep set values and the like even when power is turned off and enables the set values and the like to be rewritten, and a RAM that temporarily retains data produced during computation by the processing part.

The control device 100 is configured to perform, as an output control of the engine 50, normal control that activates an engine rotational speed changing actuator such that the output rotational speed of the engine 50 matches the set rotational speed provided by engine rotational speed changing operation members 110 that are manually operated.

Figure 3:
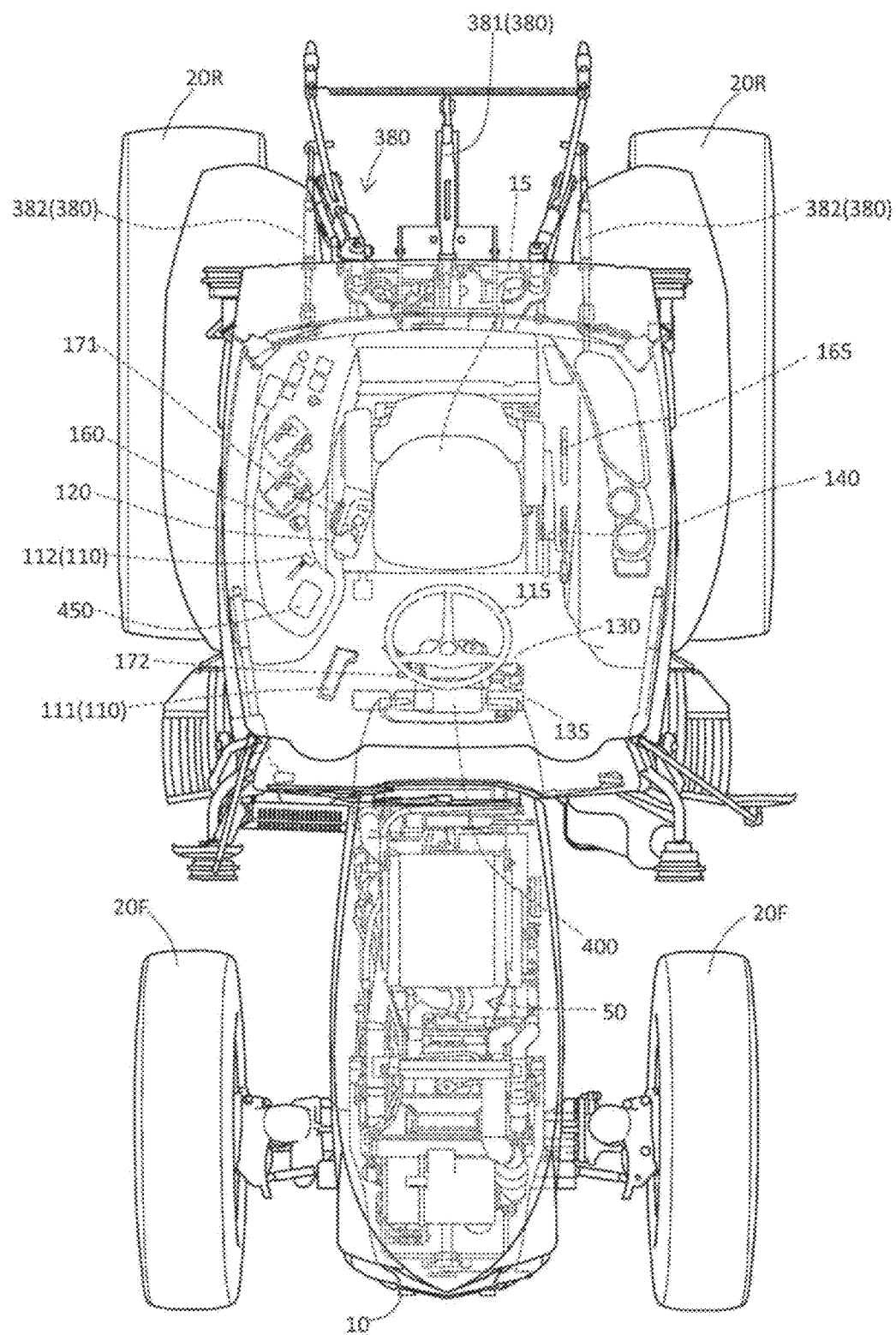
FIG. 3 is a plan view of the work vehicle.

Specifically, as shown in FIGS. 3 and 5, the work vehicle 1 has the engine rotational speed changing operation members 110 such as an accelerator pedal 111 and an accelerator lever 112, an operating-side engine rotational speed sensor 110a that detects the operational positions of the engine rotational speed changing operation members 110, a fuel injection device 40 that function as the engine rotational speed changing actuator, and an activated-side engine rotational speed sensor 50a that detects the output rotational speed of the engine 50.

As shown in FIG. 5, in this embodiment, the fuel injection device 40 has a fuel supply pump 42 that sucks fuel via a filter (not shown) from a fuel tank 41, a common rail 45 that stores pressurized fuel delivered from the fuel supply pump 42 in a pressurized manner, and a plurality of injectors 46 that inject the pressurized fuel in the common rail 45 into each cylinder of the engine 50.

Reference number 45a in FIG. 5 denotes a pressure sensor that detects the inner pressure of the common rail 45.

The control device 100 under the above normal control activate the injectors 46 using the set rotational speed detected by the operating-side engine rotational speed sensor 110a as a target rotational speed of the engine output rotational speed.

Specifically, as for the control device 100, control data showing the relationship between the engine rotational speed and the amount of controlling injectors (the amount of fuel to be injected) is stored in advance in a memory part such as a ROM, and the control device 100 activates and controls the injectors 46 in reference to the control data.

That is, the control device 100 receives an input of the operational positions of the engine rotational speed changing operation members 110 such as an accelerator lever from the accelerator sensor 110a to recognize the target engine rotational speed, activates the injectors 46 to inject fuel in an amount that is calculated with reference to the control data and that corresponds to the target engine rotational speed, determines whether the actual engine rotational speed detected by the engine rotational speed sensor 50a matches the target engine rotational speed, and activates and controls the injectors 46 such that both engine rotational speeds match.

The work vehicle 1 of this embodiment is configured such that the upper limit value of the rotational speed of the engine 50 can be set at any value.

Specifically as shown in FIG. 5, the work vehicle 1 is provided with an engine rotational speed upper limit setting member 510.

The control device 100 is configured such that, in a state in which the target engine rotational speed when the engine rotational speed changing operation member 110 is operated to the maximum extent is limited to an engine rotational speed upper limit value that is set by the engine rotational speed upper limit setting member 510, the control device 100 activates and controls the fuel injection device 40 to cause the output rotational speed of the engine 50 to arrive at a rotational speed corresponding to the operational positions of the engine rotational speed changing operation members 110.

Reference number 510a in FIG. 5 denotes a sensor that detects the operational position of the engine rotational speed upper limit setting member 510.

Thus, with the engine rotational speed upper limit setting function, it is possible to effectively prevent any troubles resulting from an unintended input of power at a high rotational speed into working devices, such as a tiller and a transplanter to which rotary power is operatively transmitted from the engine 50, due to an erroneous operation on the engine rotational speed changing operation members 110.

Figure 4:
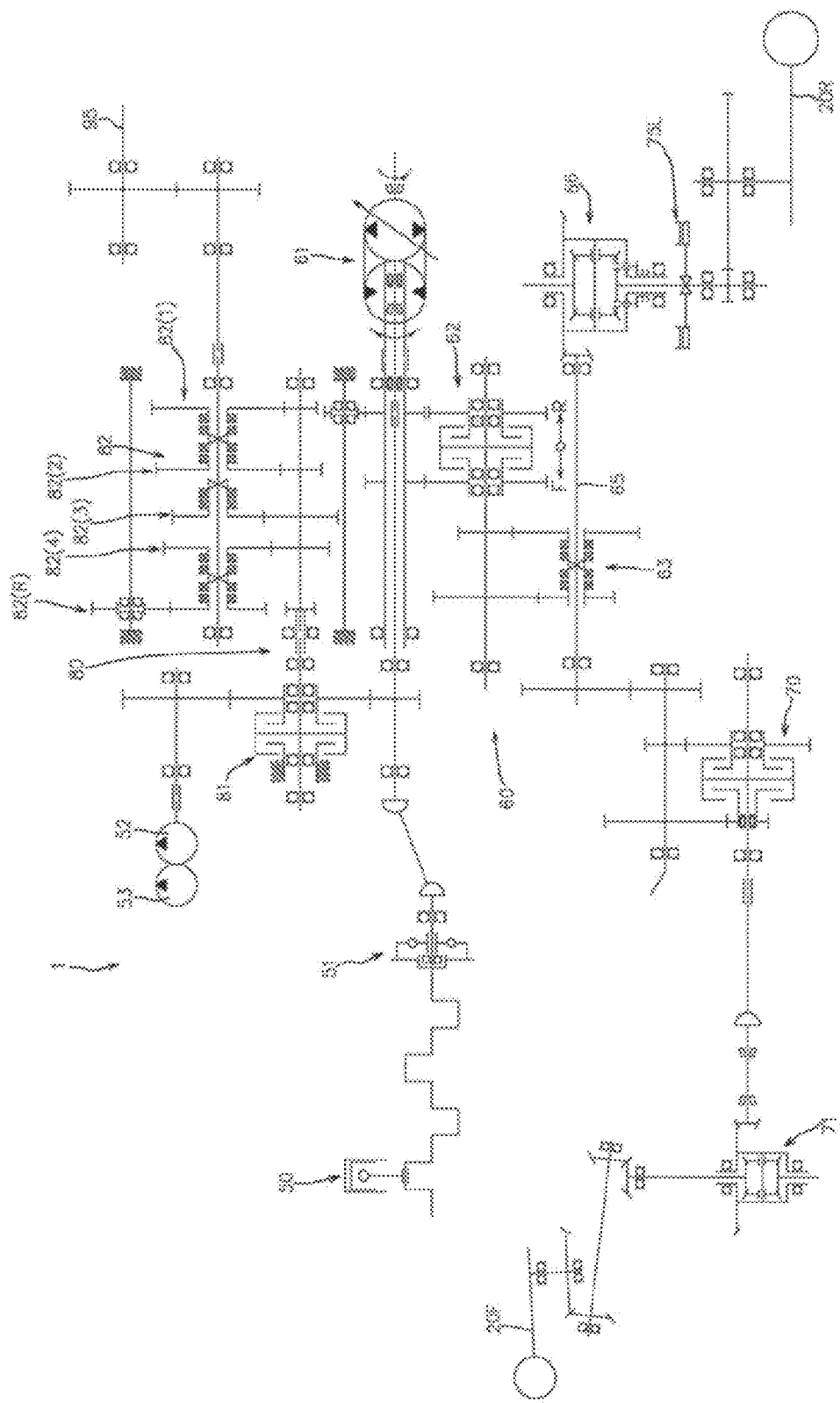
FIG. 4 is a schematic power transmission diagram of the work vehicle.

As shown in FIG. 4, in this embodiment, the traveling-system power transmission structure 60 has a hydrostatic transmission (HST) 61 that functions as a main transmission.

The HST 61 as shown in FIG. 4 is configured to continuously change the speed of rotary power from the engine 50 that is input via a main clutch 51.

Reference numbers 52 and 53 in FIG. 5 denote a charge pump and an auxiliary pump, respectively, that are driven by rotary power from the engine 50 that is input via the main clutch 51.

In this embodiment, the HST 61 is configured to perform a speed change action via a main speed change actuator 220 that is activated and controlled by the control device 100.

Specifically, as shown in FIG. 5, in the work vehicle 1, the control device 100 activates and controls the main speed change actuator 220 such that the output rotational speed of the HST 61 detected by an activated-side speed change sensor (a vehicle speed sensor) 61a arrives at a speed corresponding to a manual operation on the main speed changing operation members 120 such as a main speed change lever.

Reference number 120a in FIG. 5 is an operating-side speed change sensor that detects the operational position (the direction of operation and/or the amount of operation) of the main speed changing operation member 120.

Also, the work vehicle 1 of this embodiment is configured such that the upper limit value (the maximum speed value) of the output rotational speed of the HST 61 when the main speed changing operation member 120 is operated to the maximum extent can be set at any value.

Specifically, as shown in FIG. 5, the work vehicle 1 is provided with a maximum speed setting member 515.

The control device 100, in a state in which the maximum output rotational speed of the HST 61 when the main speed changing operation member 120 is operated to the maximum extent is limited to a rotational speed that is set by the maximum speed setting member 515, activates and controls the main speed change actuator 220 such that the output rotational speed of the HST 61 is changed in response to the operational position of the main speed changing operation member 120.

Reference number 515*a* in FIG. 5 denotes a sensor that detects the operational position of the maximum speed setting member 515.

The maximum speed setting member 515 can be a component separate from the engine rotational speed upper limit setting member 510. Alternatively, both members 510 and 515 can be formed into a commonly operated component.

That is, in the case of forming the maximum speed setting member 515 and the engine rotational speed upper limit setting member 510 into a common component, an engine rotation/vehicle speed selector switch (not shown) and an engine rotation/vehicle speed setting dial (not shown) that function as both the engine rotational speed upper limit setting member 510 and the maximum speed setting member 515 are provided.

The engine rotation/vehicle speed selector switch is a component for switching between an engine rotational speed upper limit setting phase and a maximum speed setting phase.

Specifically, the engine rotation/vehicle speed selector switch can be switched for the engine side and the vehicle speed side, and the control device 100 recognizes whether an operator wishes to register an engine rotational speed upper limit value or register a maximum speed value according to the operational position of the engine rotation/vehicle speed selector switch.

Then, the control device 100 registers the value set through the engine rotation/vehicle speed setting dial as the upper limit value of the side selected through the engine rotation/vehicle speed selector switch (that is, the rotational speed of engine output or the rotational speed of HST output).

In this embodiment, the control device 100 is configured to be capable of storing a plurality of traveling modes that are defined by combinations of engine rotational speed upper limit values set by the engine rotational speed upper limit setting member 510 and maximum speed values set by the maximum speed setting member 515, and initiating any one of the traveling modes in response to an instruction received through a manual operation. That is, as shown in FIG. 5, the work vehicle 1 is provided with a traveling-mode switching operation member 520 that can be manually operated.

The traveling-mode switching operation member 520 is configured to be capable of switching among the traveling modes (for example, two traveling modes including A mode and B mode).

That is, the traveling-mode switching operation member 520 can selectively take traveling mode positions (for example, an A mode position or a B mode position) corresponding to each traveling mode in response to a manual operation.

In a state in which the traveling-mode switching operation member 520 is placed in one traveling mode position (the A mode position or the B mode position in the above example), the control device 100, when the engine rotational speed upper limit setting member 510 and the maximum speed setting member 515 are operated, stores the values set through this operation as the engine rotational speed upper limit value and the maximum speed value of the aforementioned traveling mode.

The engine rotational speed upper limit value and the maximum speed value may be stored, for example, in an EEPROM that keeps the values even when the power is turned off and enables rewriting.

The operational position of the traveling-mode switching operation member 520 is detected by a sensor 520*a* (see FIG. 5).

In a state in which a plurality of traveling modes are stored as described above, the control device 100 initiates a traveling mode corresponding to the operational position of the traveling-mode switching operation member 520.

It is also possible to configure the traveling-mode switching operation member 520 to be capable of taking a traveling mode cancelling position in addition to the traveling mode positions, and configure the control device 100 to reach a state in which the traveling modes are cancelled when the traveling-mode switching operation member 520 takes a traveling mode canceling position.

As shown in FIG. 4, in this embodiment, the traveling-system power transmission structure 60 has a forward-reverse switching device 62.

The forward-reverse switching device 62 is configured to change the direction of rotary power that is operatively transmitted from the HST 61 and output the resulting rotary power.

Specifically, the forward-reverse switching device 62 is configured to be capable of selectively taking a forward state in which rotary power from the HST 61 is output to the driving wheels as rotary power in a normal rotational direction (a forward direction), a reversed state in which rotary power from the HST 61 is output to the driving wheels as rotary power in a backward rotational direction (a reverse direction), and a neutral state in which power transmission from the HST 61 to the driving wheels is interrupted.

The forward-reverse switching device 62 takes a forward state or a reverse state in response to a manual operation on a forward-reverse switching operation member 130 such as a F/R lever that can be manually operated, and takes a neutral state (a power interrupted state) in response to a clutch disengagement operation on a main clutch operation member 135 that can be manually operated.

In this embodiment, the output states of the forward-reverse switching device 62 are switched by a forward-reverse switching actuator 230.

Specifically, as shown in FIG. 5, in the work vehicle 1, the control device 100 activates and controls the forward-reverse switching actuator 230 such that the output state of the forward-reverse switching device 62 is changed in response to manual operations on the forward-reverse switching operation member 130 and the main clutch operation member 135.

In FIG. 5, reference numbers 130*a* and 135*a* denote an operating-side forward-reverse sensor and an operating-side main clutch sensor that respectively detect the operational positions of the forward-reverse switching operation member 130 and the main clutch operation member 135, and a reference number 62*a* denotes a forward-reverse sensor that detects the activating state of the forward-reverse switching device 62.

As shown in FIG. 4, in this embodiment, the traveling-system power transmission structure 60 has a gear-type multi-stage transmission 63 that functions as an auxiliary transmission.

The gear-type multi-stage transmission 63 is disposed on the downstream side in the power transmission direction of the forward-reverse switching device 62, stepwisely changes the speed of rotary power that is input via the forward-reverse switching device 62, and outputs the resulting rotary power toward the traveling-system output shaft 65.

The multi-stage transmission 63 is configured to activate the speed-changing stage or gear selected by an auxiliary speed changing operation member 140 (see FIG. 5).

As shown in FIG. 4, in this embodiment, the multi-stage transmission 63 has two speed-changing stages, i.e., a high-speed stage and a low-speed stage.

In this embodiment, the speed-changing status of the multi-stage transmission 63 is changed by an auxiliary speed change actuator 240 (see FIG. 5).

Specifically, as shown in FIG. 5, in the work vehicle 1, the control device 100 activates and controls the auxiliary speed change actuator 240 such that the speed-changing stage of the multi-stage transmission 63 are changed in response to a manual operation on the auxiliary speed changing operation member 140.

In FIG. 5, reference number 140a denotes an operating-side auxiliary speed change sensor that detects the operational position of the auxiliary speed changing operation member 140, and reference number 63a is an auxiliary speed change sensor that detects the speed-changing stage of the multi-stage transmission 63.

In this embodiment, the pair of rear wheels 20R are main driving wheels, and the pair of front wheels 20F are steered wheels as well as sub-driving wheels.

That is, as shown in FIGS. 4 and 5, the work vehicle 1 is provided with a turning operation member 115 such as a steering wheel that is manually operated, an operating-side turning sensor 115a that detects the operational position of the turning operation member 115, a turning actuator 215 such as a power steering device that steers the steered wheels (the front wheels 20F in this embodiment), and an activated-side turning sensor 90a that detects a vehicle turning angle.

The control device 100 activates and controls the turning actuator 215 such that the vehicle turning angle detected by the actuated-side turning sensor 90a matches the operation angle of the turning operation member 115 detected by the operating-side turning sensor 115a.

In this embodiment, as shown in FIG. 4, the traveling-system power transmission structure 60 is further provided with a main-driving-wheel-side differential gear device 66 that differentially transmits the rotary power of the traveling-system output shaft 65 to the pair of rear wheels 20R that function as main driving wheels, a sub-driving-wheel driving device 70 that inputs the rotary power of the traveling-system output shaft 65, a sub-driving-wheel-side differential gear device 71 that differentially transmits the rotary power from the sub-driving wheel driving device 70 to the pair of front wheels 20F that function as sub-driving wheels, and a pair of right and left braking devices 75L, 75R that can apply a braking force to the pair of right and left main driving wheels. Only the left braking device 75L is shown in FIG. 4.

The sub-driving wheel driving device 70 is configured to be capable of selectively taking, in response to a manual operation on a sub-driving-wheel driving switching operation member 145, a four-wheel-drive equal speed state in which the rotary power of the traveling-system output shaft 65 is output to the sub-driving wheels (the front wheels 20F in this embodiment) such that the sub-driving wheels are always driven at the same speed as the main driving wheels (the rear wheels 20R in this embodiment); a four-wheel-drive, speed-increased-when-turning state in which the rotary power of the traveling-system output shaft 65 is output to the sub-driving wheels such that the sub-driving wheels are driven at the same speed as the main driving wheels when the turning angle detected by the turning angle sensor 90a (see FIG. 5) is equal to or smaller than a predetermined angle, and the sub-driving wheels are driven at a speed higher than the main driving wheels (for example, about twice as fast) when the turning angle exceeds the predetermined angle; and a two-wheel-drive state in which the sub-driving wheels are not driven.

In this embodiment, the sub-driving-wheel driving device 70 switches between the power transmission states via a sub-driving-wheel driving switching actuator 245.

Specifically, as shown in FIG. 5, in the work vehicle 1, the control device 100 activates and controls the sub-driving-wheel driving switching actuator 245 such that the sub-driving-wheel driving device 70 takes a power transmission state corresponding to a manual operation on the sub-driving-wheel driving switching operation member 145.

In FIG. 5, reference number 145a denotes a sub-driving-wheel driving switching sensor that detects the operational position of the sub-driving-wheel driving switching operation member 145, and reference number 70a is a sub-driving-wheel sensor that detects the power transmission state of the sub-driving-wheel driving device 70.

The pair of braking devices 75L, 75R are individually capable of taking a brake applying state and a brake releasing state in response to a manual operation on a pair of brake operation members 150L, 150R that are manually operated.

In this embodiment, the pair of braking devices 75L, 75R switch between a brake applying state and a brake releasing state via a pair of brake actuators 250L, 250R, respectively.

Specifically, the control device 100 activates and controls the pair of brake actuators 250L, 250R such that the pair of braking devices 75L, 75R are in a brake applying state or a brake releasing state in response to a manual operation on the pair of brake operation members 150L, 150R.

In FIG. 5, reference numbers 150La, 150Ra denote sensors that detect the operational states of the pair of brake operation members 150L, 150R, and reference numbers 75La, 75Ra denote sensors that detect the operational states of the pair of braking devices 75L, 75R.

Next, the PTO power transmission structure 80 will now be described.

As shown in FIG. 4, in this embodiment, the PTO-system power transmission structure 80 has a PTO clutch 81 and a PTO transmission 82.

The PTO clutch 81 is configured to selectively transmit or interrupt rotary power from the engine 50 that is input via the main clutch 51.

The PTO transmission 82 is configured to change the speed of rotary power from the engine 50 that is input via the PTO clutch 81 and output the resulting rotary power toward the PTO shaft 95.

That is, as shown in FIG. 5, the control device 100 activates and controls a PTO clutch actuator 260 to bring the PTO clutch 81 into a power transmission state and an interrupted state in response to a manual operation on the PTO ON-OFF operation member 160 that is manually operated.

In FIG. 5, reference number 160a denotes a sensor that detects the operational position of the PTO ON-OFF operation member 160, and reference number 81a denotes a sensor that detects the activating state of the PTO clutch 81.

Also, as shown in FIG. 5, the control device 100 activates and controls a PTO speed change actuator 265 to cause the PTO transmission 82 to perform a speed change action in response to a manual operation on the PTO speed changing operation member 165 that is manually operated.

Specifically, the PTO transmission 82 is a multi-stage type, and any speed-changing stage of a plurality of speed-changing stages can be selectively activated.

In this embodiment, as shown in FIG. 4, the PTO transmission 82 has gear trains 82(1) to 82(4) for normal-rotation-side first to fourth speed-changing stages and a gear train 82(R) for a reverse-rotation-side speed-changing stage (R), and is configured such that any one of the gear trains is selectively brought into a power transmission state by the PTO actuator 265.

The activating state (the speed-changing stage) of the PTO transmission 82 is detected by the actuated-side PTO speed change sensor 82*a* (see FIG. 5) that detects the activating state of the PTO transmission 82 or the PTO actuator 265.

The PTO speed changing operation member 165 is configured to be capable of taking operational positions corresponding to the speed-changing stages of the PTO transmission 265 (any of the normal-rotation-side first to fourth speed-changing stages and the reverse-rotation-side speed-changing stage in this embodiment).

The operational position of the PTO speed changing operation member 165 is detected by the operating-side PTO speed change sensor 165*a* (see FIG. 5).

Moreover, the work vehicle 1 of this embodiment is provided with a PTO rotation sensor 95*a* (see FIG. 5) that detects the actual rotational speed of the PTO shaft 95.

As described above, the work vehicle 1 of this embodiment is in the form of a tractor and, in a state in which rotary power from the engine 50 can be transmitted via the PTO shaft 95, is capable of accommodating an working device 200 such as a rotary tiller via a linkage mechanism 380 in such a manner that the working device 200 can be raised or lowered, and tilted in a rightward-leftward direction.

Figure 2:
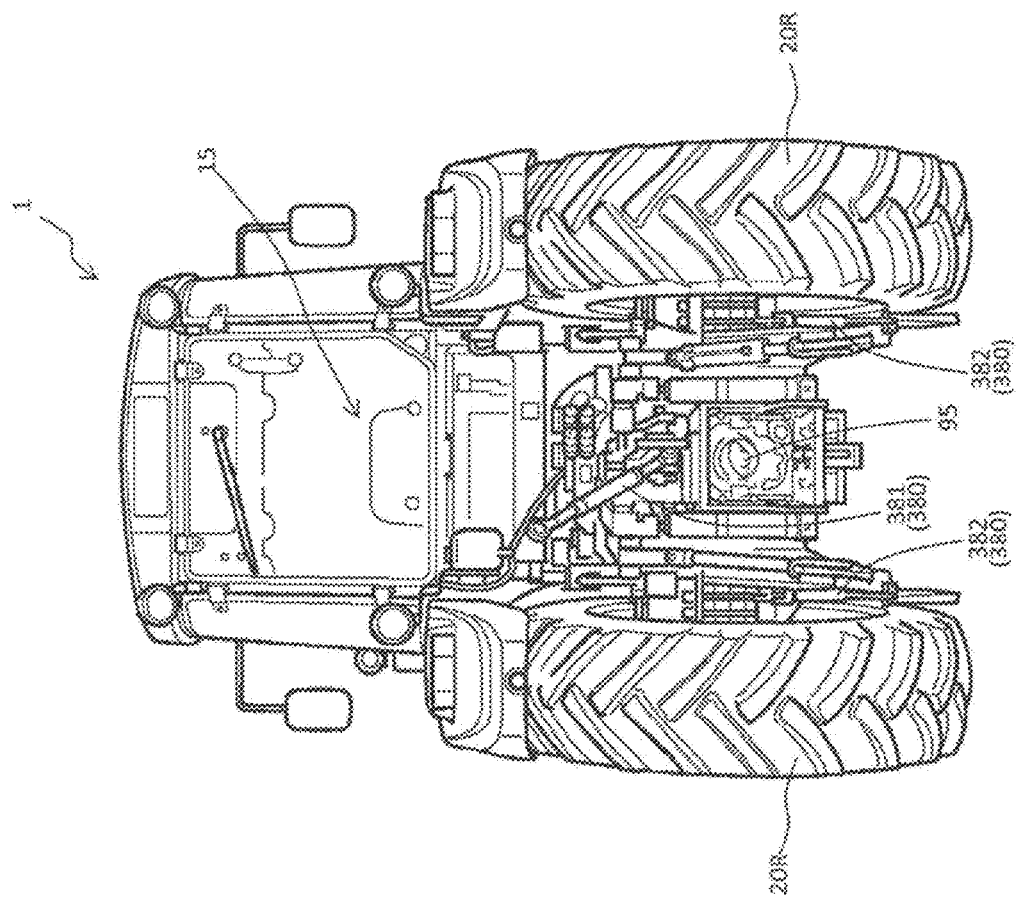
FIG. 2 is a rear view of the work vehicle.

As shown in FIGS. 2 and 3, the linkage mechanism 380 may have, for example, a top link 381 and a pair of right and left lower links 382.

Specifically, as shown in FIG. 5, the work vehicle 1 is provided with a raising-lowering actuator 270 that raises or lowers the working device 200 and a tilting actuator 280 that changes the rightward-leftward tilt of the working device 200.

The control device 100 activates and controls the raising-lowering actuator 270 and the tilting actuator 280 based on manual operation signals.

Specifically, the work vehicle 1 is provided with, as raising-lowering operation members 170, a manual raising-lowering operation member 171, one-touch raising-lowering operation member 172, a raised-position setting member 173, and a raising-lowering fine tuning operation member 174.

When the manual raising-lowering operation member 171 is operated, the control device 100 activates the raising-lowering actuator 270 such that the working device 200 is placed at a height corresponding to the operational position of the manual raising-lowering operation member 171.

In FIG. 5, reference number 171*a* denotes a sensor that detects the operational position of the manual raising-lowering operation member 171, and reference number 201*a* is a lift sensor that detects the raised-lowered position of the working device 200.

When the one-touch raising-lowering operation member 172 receives a raising operation, the control device 100 activates the raising-lowering actuator 270 such that the working device 200 is raised to a height set by the raised-position setting member 173.

In FIG. 5, reference number 172*a* denotes a sensor that detects the operational state of the one-touch raising-lowering operation member 172, and reference number 173*a* denotes a sensor that detects a position set by the raised-position setting member 173.

When the one-touch raising-lowering operation member 172 receives a lowering operation, the control device 100 activates the raising-lowering actuator 270 such that the working device 200 is lowered to a lowered position defined by the operational position of the manual raising-lowering operation member 171.

That is, in this embodiment, the manual raising-lowering operation member 171 also functions as a lowered position setting member.

The raising-lowering fine tuning operation member 174 is capable of a raising operation and a lowering operation.

Specifically, the raising-lowering fine tuning operation member 174 is configured to take a raised position when receiving a pressing operation in the upward direction, automatically resume a neutral position once the pressing operation in the upward direction is canceled, take a lowered position when receiving a pressing operation in the downward direction, and automatically resume a neutral position once the pressing operation in the downward direction is canceled.

During the time when the raising-lowering fine tuning operation member 174 receives a raising operation and a lowering operation, the control device 100 activates the raising-lowering actuator 270 such that the working device 200 is raised and lowered at a predetermined speed, respectively, and terminates the raising and lowering of the working device 200 when the raising operation and the lowering operation are cancelled and the raising-lowering fine tuning operation member 174 returns to a neutral position.

In FIG. 5, reference number 174*a* denotes a sensor that detects the operational position of the raising-lowering fine tuning operation member 174.

Moreover, the work vehicle 1 of this embodiment has a tilling depth automatic mode with regard to the raising and lowering of the working device 200.

The tilling depth automatic mode is a control mode for activating and controlling the raising-lowering actuator 270 such that the tilling depth position of the working device 200 detected by a tilling depth sensor 203*a* (see FIG. 5) matches a set position that is set by a tilling depth setting dial 176 (see FIG. 5).

The control device 100 can switch between the activated state and the cancelled state of the tilling depth automatic mode in response to a manual operation on a tilling depth automatic switch 175 (see FIG. 5) that can be turned on and off.

In FIG. 5, reference number 175*a* denotes a sensor that detects the operational state of the tilling depth automatic switch 175, and reference number 176*a* denotes a sensor that detects the operational state of the tilling depth setting dial 176.

Also, as shown in FIG. 5, the work vehicle 1 is provided with a tilting operation member 180, and the control device 100 activates and controls the tilting actuator 280 such that the working device 200 is tilted in the rightward-leftward direction in response to a manual operation on the tilting operation member 180.

In FIG. 5, reference number 180*a* denotes a sensor that detects the operational position of the tilting operation member 180, and reference number 202*a* denotes a tilt sensor that detects the tilt of the working device 200.

Moreover, the work vehicle 1 of this embodiment has a tilt automatic mode with respect to the tilt of the working device 200.

The tilt automatic mode is a control mode for activating and controlling the tilting actuator 280 such that the rightward-leftward tilt of the working device 200 detected by the tilt sensor 202a matches the tilt set by a tilt setting dial 186 (see FIG. 5).

The control device 100 can switch between an activated state and a cancelled state of the tilt automatic mode in response to a manual operation on a tilt automatic switch 185 (see FIG. 5) that can be turned on and off.

In FIG. 5, reference number 185a denotes a sensor that detects the operational state of the tilt automatic switch 185, and reference number 186a denotes a sensor that detects the operational state of the tilt setting dial 186.

The work vehicle 1 is further provided with a display device having a liquid crystal display part.

As shown in FIGS. 3 and 5, in this embodiment, the work vehicle 1 is provided with an instrument panel 400 disposed in front of the driver's seat 15 and a sub-display 450 disposed at the side of the driver's seat 15, as the display device.

The instrument panel 400 may have, for example, a tachometer that shows the rotational speed of the engine 50, a plurality of indicator lamps that show whether various control modes provided in the work vehicle 1 are activated, and a liquid crystal display portion that functions as the liquid crystal display part.

The sub-display 450 may have a liquid crystal display portion that functions as the liquid crystal display part.

Next, a PTO rotational speed displaying function provided in the work vehicle 1 of this embodiment will now be described.

The control device 100 is configured to calculate, for each of the speed-changing stages in the PTO transmission 82, the expected maximum rotational speed of PTO rotary power that is output from the PTO shaft 95 when the engine rotational speed changing operation member 110 is operated to the maximum extent, and shows calculating results in the liquid crystal display part in a listed manner.

According to this configuration, it is possible for an operator to be informed of the maximum rotational speed of PTO rotary power that may be output from the PTO shaft 95 for each speed-changing stage of the PTO transmission 82 without actually performing a speed change operation on the PTO transmission 82.

Accordingly, the operator can easily provide the PTO shaft 95 with a rotational speed of PTO rotary power suitable for work at that time and enhance work efficiency.

Specifically, in the control device 100, a PTO rotational speed display control mode is activated in response to the main power supply of the work vehicle 1 being turned on.

Figure 6:
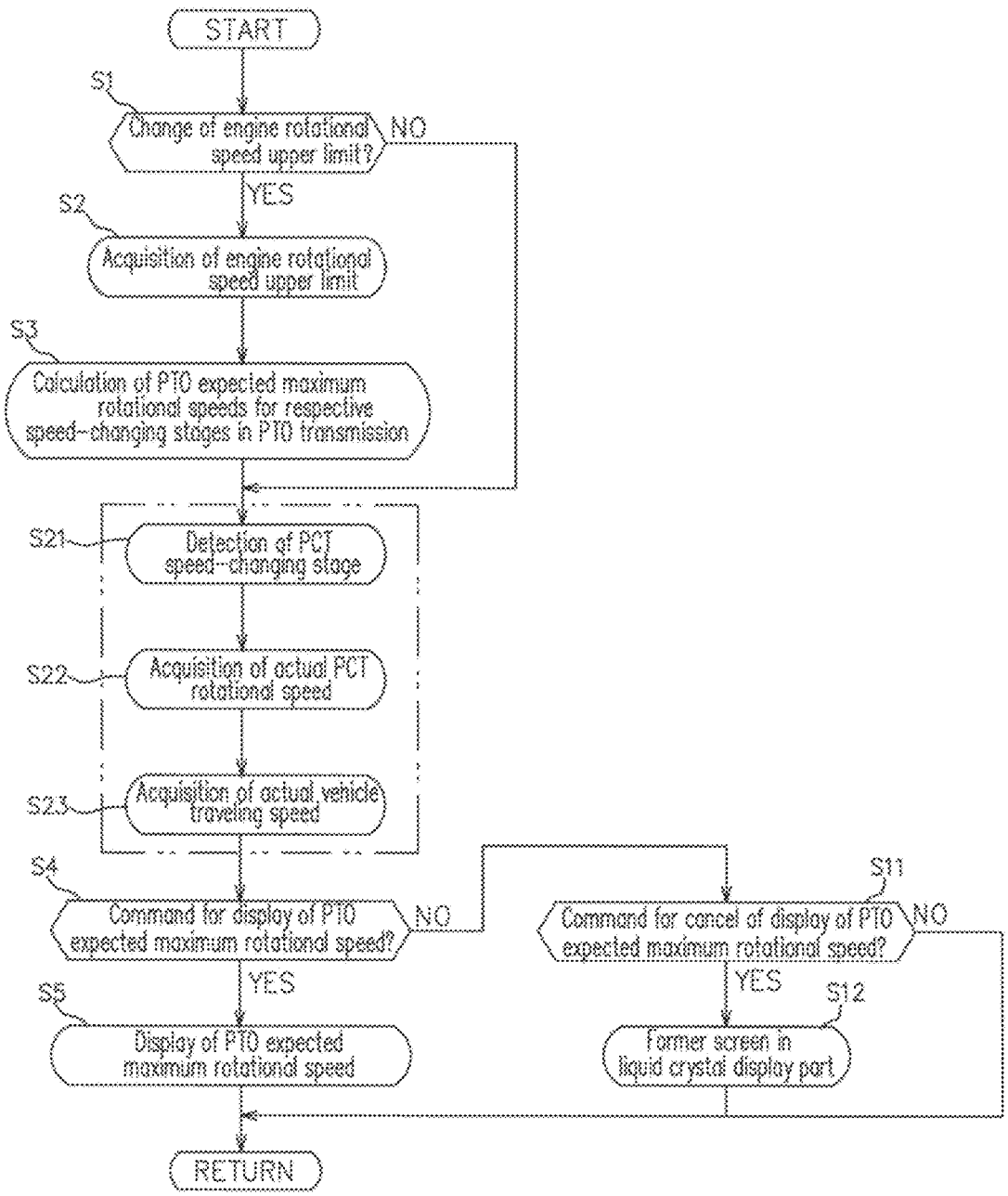
FIG. 6 is a control flow chart of a PTO rotational speed display control mode executed by the control device provided in the work vehicle.

FIG. 6 shows a flow of control of the PTO rotational speed display control mode.

The control device 100 determines whether the engine rotational speed upper limit value has changed (step S1).

Here, whether the engine rotational speed upper limit value has changed means whether an effective engine rotational speed upper limit value has changed.

That is, this includes, for example, a case where as a result of the traveling mode being changed through the traveling mode switching operation member 520, the effective engine rotational speed upper limit value at that time is changed, and a case where a different engine rotational speed upper limit value is set, and this engine rotational speed upper limit value is made effective.

If YES in step S1, the control device 100 obtains the changed engine rotational speed upper limit value (step S2) and, using this engine rotational speed upper limit value, calculates the maximum rotational speed of the PTO rotary power (the PTO expected maximum rotational speed) that may be output from the PTO shaft 95 for each speed-changing stage of the PTO transmission 82 (step S3).

That is, in step S3, the control device 100 calculates, as a PTO expected maximum rotational speed, a PTO rotational speed that the PTO shaft 95 may have if the engine rotational speed changing operation member 110 is operated to the maximum extent at that time, for each speed-changing stage in the PTO transmission 82.

The calculated PTO expected maximum rotational speed of each PTO speed-changing stage can be stored, for example, in an EEPROM that keeps it even when the power is turned off and enables rewriting.

Then, in step S4, the control device 100 determines whether a command for displaying the PTO expected maximum rotational speed has been received.

Here, an example of a command for displaying the PTO expected maximum rotational speed is an ON operation on the PTO ON-OFF operation member 160.

That is, when the PTO ON-OFF operation member 160 receives an ON operation and rotary power is output from the PTO shaft 95, the control device 100 determines that a command for displaying the PTO expected maximum rotational speed has been received.

Instead of or in addition to this, when a display switching operation member 430 (see FIG. 5) is operated in a predetermined manner, the control device 100 can determine that a command for displaying the PTO expected maximum rotational speed has been received.

If YES in step S4, or that is, if a command for displaying the PTO expected maximum rotational speed is received, the control device 100 causes the liquid crystal display part to show a PTO rotational speed display screen that lists the PTO expected maximum rotational speed of each speed-changing stage in the PTO transmission 82 (step S5).

Figure 7:
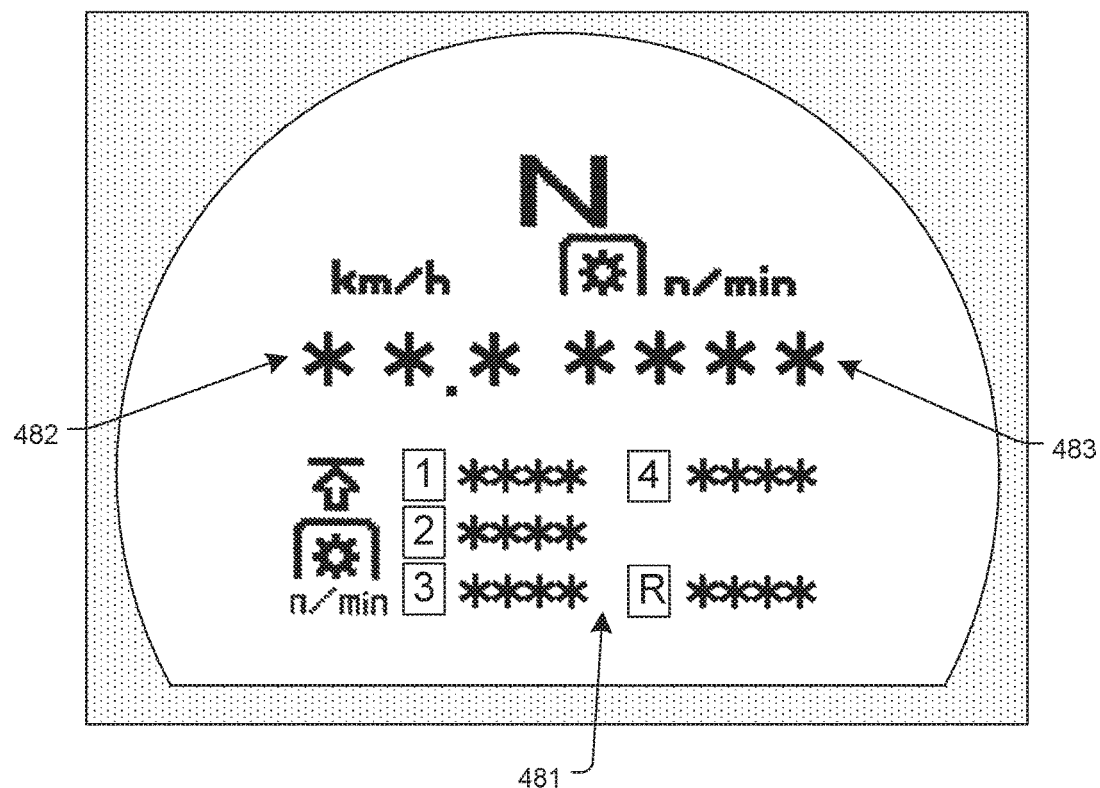
FIG. 7 is a schematic view of one example of a PTO rotational speed display screen that shows PTO expected rotational speed of PTO rotary power for each of speed-changing stages in a PTO transmission in a listed manner.

FIG. 7 shows an example of the PTO rotational speed display screen.

In the example shown in FIG. 7, the PTO rotational speed display screen has a PTO expected rotational speed display area 481 that shows the PTO expected maximum rotational speed for each PTO speed-changing stage.

As described above, in this embodiment, the PTO transmission 82 has a total of five speed-changing stages including normal-rotation-side first to fourth speed-changing stages and a reverse-rotation-side speed-changing stage.

Accordingly, the PTO expected rotational speed display area 481 shows a list of the PTO expected maximum rotational speeds for each of the cases where the normal-rotation-side first speed-changing stage is activated, the normal-rotation-side second speed-changing stage is activated, the normal-rotation-side third speed-changing stage is activated, the normal-rotation-side fourth speed-changing stage is activated, and the reverse-rotation-side speed-changing stage is activated.

In the example shown in FIG. 7, the PTO rotational speed display screen includes a vehicle speed display area 482 that shows the actual vehicle speed at that time, and a PTO actual rotational speed display area 483 that shows the actual rotational speed of the PTO shaft 95 at that time.

In the case of causing the PTO rotational speed display screen to show the actual vehicle speed and the PTO actual rotational speed in this way, as shown in FIG. 6, the PTO rotational speed display control mode may have a step (step S22) of obtaining the PTO actual rotational speed based on a signal from the PTO rotation sensor 95*a* and a step (step S23) of obtaining the actual vehicle speed based on a signal from a vehicle speed sensor 61*a*, on the upstream side of step S4.

It is also possible to show a PTO speed-changing stage that is activated or engaged at that time on the PTO rotational speed display screen.

In this case, as shown in FIG. 6, the PTO rotational speed display control mode may have a step (step S21) of recognizing a PTO speed-changing stage that is activated or engaged based on a signal from the operating-side PTO speed change sensor 165*a* or the actuated-side PTO speed change sensor 82*a*, on the upstream side of step S4.

Then, after step S5, the processing of the control device 100 returns to step S1.

Here, if NO in step S1, or that is, if the engine rotational speed upper limit value has not changed, the control device 100 skips step S2 and step S3 and advances to step S4 (or a necessary step among steps 21 to 23) because an effective engine rotational speed upper limit value at that time has already been obtained.

Moreover, If NO in step S4, or that is, if no command for displaying the PTO expected maximum rotational speed is received, the control device 100 determines whether a command for cancelling the display of the PTO expected maximum rotational speed (step S11) has been received.

The command for cancelling the display of the PTO expected maximum rotational speed is a command for causing the liquid crystal display part to return to a previous screen shown before the PTO rotational speed display screen, when the liquid crystal display part shows the PTO rotational speed display screen.

An example of the command for cancelling the display of the PTO expected maximum rotational speed is an OFF operation performed on the PTO ON-OFF operation member 160.

That is, in a state in which an ON operation is performed on the PTO ON-OFF operation member 160 and rotary power is output from the PTO shaft 95, the control device 100 can determine that a command for cancelling the display of the PTO expected maximum rotational speed has been received when an OFF operation is performed on the PTO ON-OFF operation member 160.

Instead of or in addition to this, when the display switching operation member 430 (see FIG. 5) is operated in a predetermined manner, the control device 100 can determine that a command for cancelling the display of the PTO expected maximum rotational speed has been received.

If YES in step S11, or that is, in a state in which the liquid crystal display part shows the PTO rotational speed display screen, when a command for cancelling the display of the PTO expected maximum rotational speed has been received, the control device 100 causes the liquid crystal display part to show a previous screen (step S12), and returns to step S1.

NO in step S11 includes a case where a command for cancelling the display of the PTO expected maximum rotational speed is not input while the liquid crystal display part shows the PTO rotational speed display screen, and a case where a command for cancelling the display of the PTO expected maximum rotational speed is not input because the liquid crystal display part does not show the PTO rotational speed display screen.

In any case, the control device 100 does not change the display state of the liquid crystal display part, and returns to step S1.

That is, if NO in step S11 while the liquid crystal display part shows the PTO rotational speed display screen, the control device 100 causes the liquid crystal display part to maintain the PTO rotational speed display screen, and returns to step S1.

On the other hand, if NO in step S11 while the liquid crystal display part shows another screen (e.g., an initial screen) other than the PTO rotational speed display screen, the control device 100 maintains the display state of the liquid crystal display part as-is, and returns to step S1.

Second Embodiment

Below, another embodiment of the work vehicle of the present invention will now be described with reference to the appended drawings.

In this embodiment, the same components as those in the first embodiment are given the same reference numbers, and descriptions thereof are omitted as appropriate.

The work vehicle of this embodiment is configured to be capable of enhancing the operability of various operation members.

That is, providing a work vehicle such as a tractor with a liquid crystal display part in an instrument panel having a tachometer that shows the rotational speed of an engine and various indicator lamps is proposed (see, for example, JP 5138310B).

In the above conventional work vehicle, when a raising-lowering operation member for manually operating a raising-lowering actuator that raises or lowers an working device connected to the vehicle body is operated, the control device activates the raising-lowering actuator such that the working device is placed at a height that corresponds to the operational position of the raising-lowering operation member and, also, causes the liquid crystal display part to switch from a normal screen to a position screen to digitally display the operational position of the raising-lowering operation member on the position screen for a predetermined period of time.

That is, in the above conventional work vehicle, every time the raising-lowering operation of the working device is performed through the raising-lowering operation member, the operational position of the raising-lowering operation member is shown on the liquid crystal display part without performing a display switching operation on the liquid crystal display part.

Meanwhile, a work vehicle such as a tractor is provided with various operation members other than the raising-lowering operation member.

With the above conventional work vehicle, an operator can be informed of the raised or lowered position of the working device without directly looking at the operational position of the raising-lowering operation member and the raised-lowered position of the working device, and operability can be enhanced with regard to the raising-lowering operation of the working device.

However, what is shown on the liquid crystal display part is only the operational position of the raising-lowering operation member, and as for the operational states of other various operation members, the operational positions of corresponding operation members or the activating states of activating members that are activated and controlled in response to operations on such operation members cannot be recognized without visual verification, and thus there is room for improving the operability of operation members other than the raising-lowering operation member.

The work vehicle of this embodiment can provide enhanced operability of various operation members as compared to the above conventional work vehicle.

Figure 8:
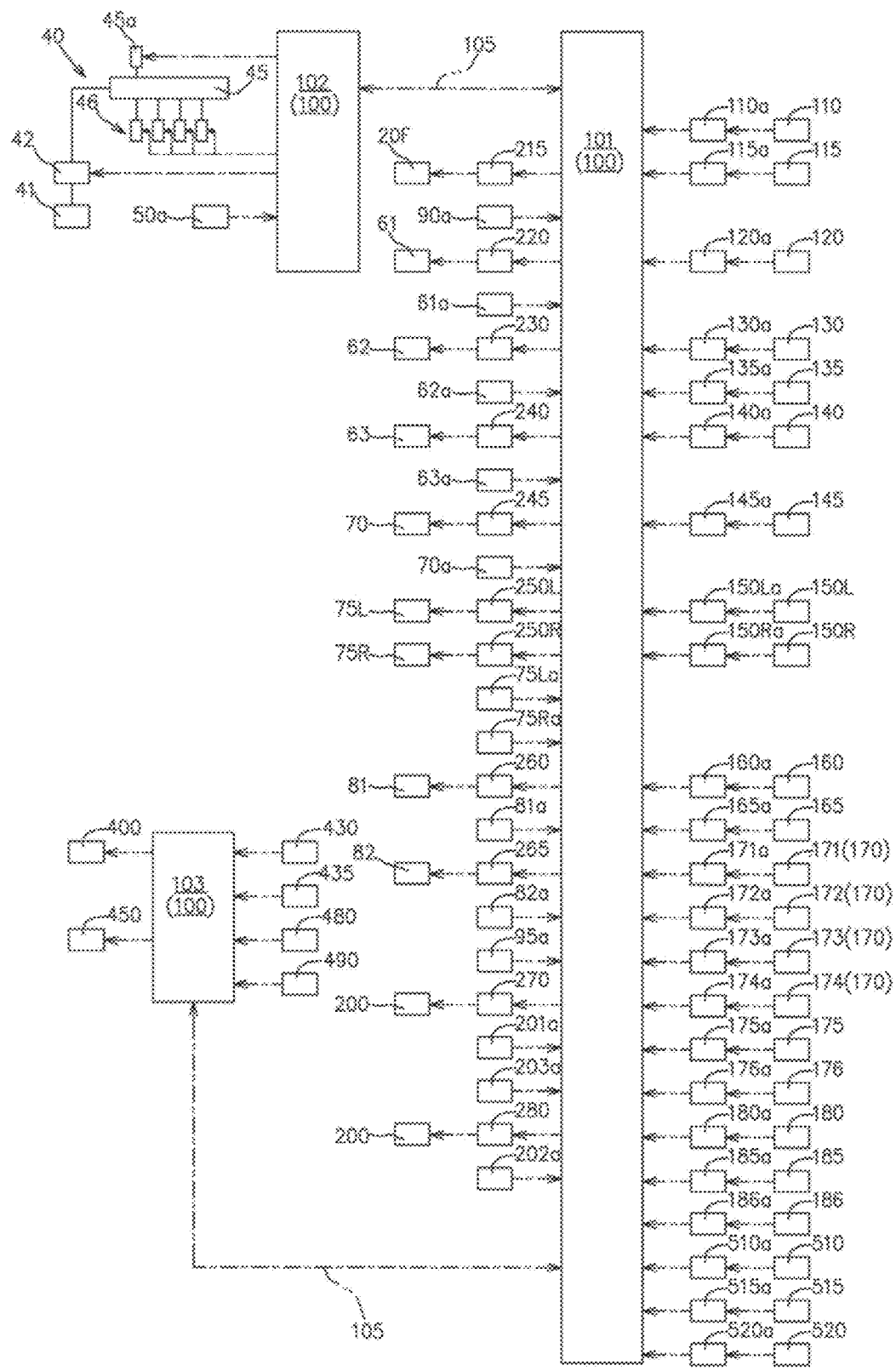
FIG. 8 is a control block diagram in a work vehicle according to a second embodiment of the present invention.

FIG. 8 shows a control block diagram in the work vehicle of this embodiment.

Figure 9:
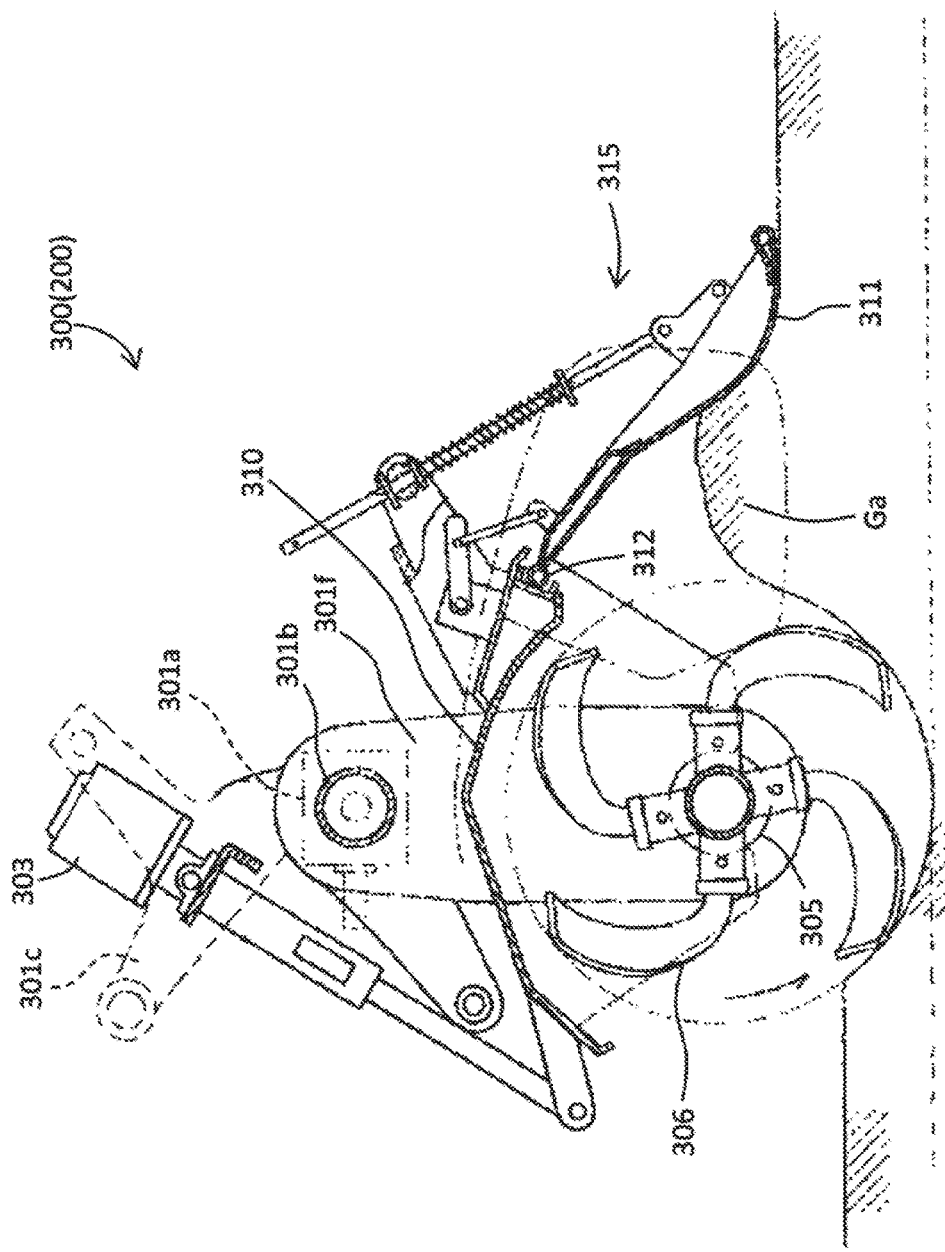
FIG. 9 is a side view of a rotary tiller that is one example of a working device attached to the work vehicle according to the second embodiment.
Figure 10:
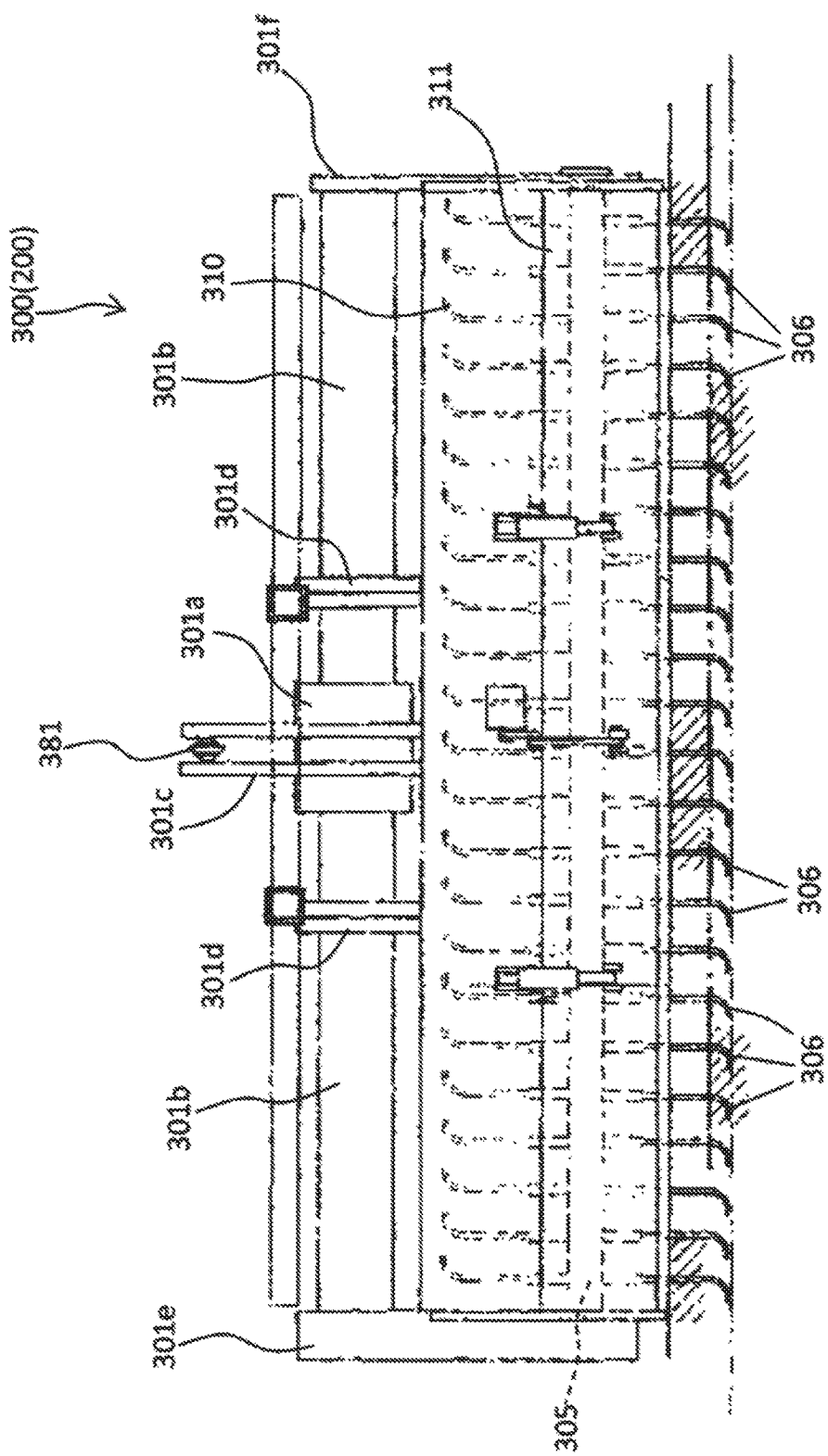
FIG. 10 is a plan view of the rotary tiller.

FIGS. 9 and 10 show a side view and a plan view, respectively, of a rotary tiller 300 that is an example of the working device 200 attached to the work vehicle of this embodiment.

As shown in FIGS. 9 and 10, the rotary tiller 300 has a frame structure 301 connected to the linkage mechanism 380, a tiller shaft 305 rotationally driven by rotary power from the PTO shaft 95, tiller tines 306 provided on the tiller shaft 305, a main cover 310 covering the space above the rotational trajectory of the tiller tines 306, and a rear cover 311 oscillably connected to the main cover 310 so as to cover the space behind the rotational trajectory of the tiller tines 306.

The frame structure 301 has a gearbox 301a into which rotary power from the PTO shaft 95 is input via a power transmission shaft, a pair of main beams 301b connected to the right and left of the gearbox 301a so as to extend in the vehicle width direction, an upper link frame 301c supported by the gearbox 301a, a pair of lower link frames 301d supported by the main beams 301b, a chain case 301e connected to the outer end in the machine body width direction of one main beam 301b, and a bearing plate 301f connected to the outer end in the machine body width direction of the other main beam 301b so as to face the chain case 301e.

In this embodiment, the frame structure 301 is connected to the vehicle main body of the work vehicle 1 via the linkage mechanism 380 such that the frame structure 301 can be raised or lowered.

Specifically, as shown in FIGS. 2 and 3, the linkage mechanism 380 has the top link 381 and the pair of right and left lower links 382, the front ends of which are rotatably connected to the main vehicle body of the work vehicle.

The rear end of the top link 381 is rotatably connected to the upper link frame 301c, and the rear ends of the pair of lower links 382 are rotatably connected to the pair of lower link frames 301d.

The tiller shaft 305 extends in the machine body width direction and is supported by the chain case 301e and the bearing plate 301f so as to be rotatable around the axis, and is rotationally driven around the axis by rotary power that is transmitted via a power transmission mechanism provided in the gearbox 301a, one main beam 301b, and the chain case 301e.

The main cover 310 is rotatable around the tiller shaft 305 and, in this embodiment, its position around the tiller shaft 305 is adjusted by an electric motor 303 (see FIG. 9).

As shown in FIG. 9, the rear cover 311 is connected to the rear end of the main cover 310 such that the front end is rotatable around a pivotal support shaft 312 extending in the machine body width direction.

The rear end of the rear cover 311 is pressed against the ground by a pressing spring mechanism 315 so as to be capable of flattening the ground surface tilled by the tiller tines 306.

Figure 11:
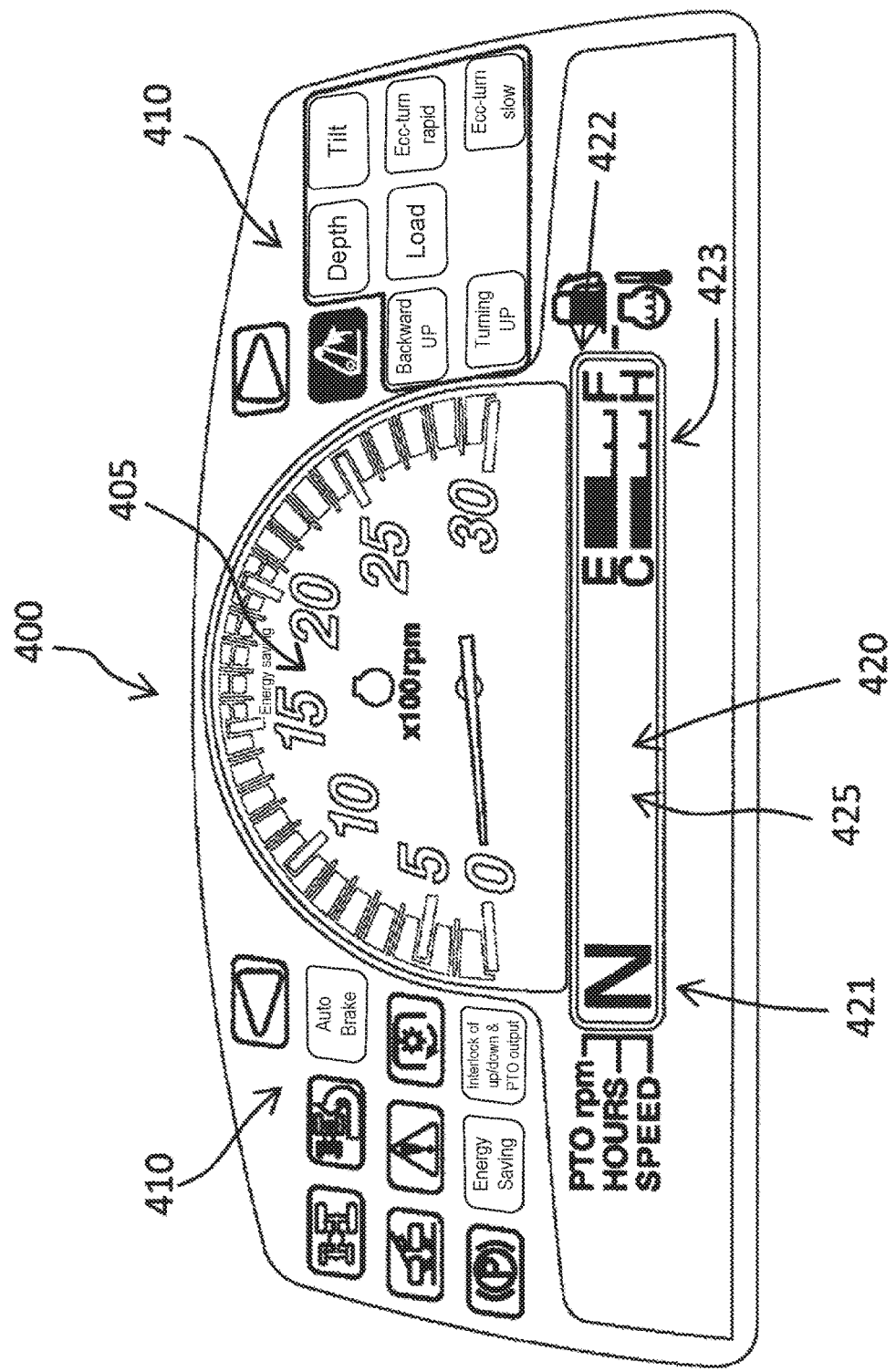
FIG. 11 is a schematic diagram of an instrument panel provided in the work vehicle according to the second embodiment.

FIG. 11 shows a schematic diagram of the instrument panel 400.

As shown in FIG. 11, the instrument panel 400 has a tachometer 405 that shows the rotational speed of the engine 50, a plurality of indicator lamps 410 that show whether various control modes provided in the work vehicle 1 are activated, and a liquid crystal display portion 420.

As shown in FIG. 11, the liquid crystal display portion 420 has a neutral display area 421 that indicates whether the forward-reverse switching device 62 is in a neutral state, a fuel level display area 422 that shows the amount of fuel remaining in a fuel tank 41, a water temperature display area 423 that shows the temperature of an engine coolant, a display switching area 425 that shows a plurality of information items switched in a sequential manner in response to a manual operation by an operator.

Figure 12:
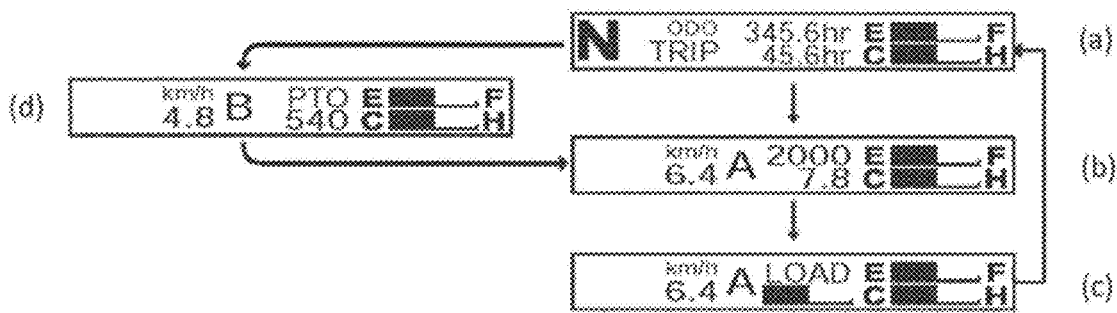
FIG. 12 is a schematic diagram showing a display state of a display switching area of a liquid crystal display portion provided in the instrument panel shown in FIG. 11, and (a)-(d) shows an hour meter display state, a vehicle speed display state, an engine load display state and a PTO rotational speed display state, respectively.

The control device 100 is configured to sequentially switch between the display states of the display switching area 425 among an hour meter display state in which the total operating time of the engine 50 and the post-reset operating time of the engine 50 are shown (see FIG. 12(a)), a vehicle speed display state in which the vehicle speed, the selected traveling mode, and the engine rotational speed upper limit value and the maximum speed value set for that traveling mode are shown (see FIG. 12(b)), and an engine load display state in which the vehicle speed, the selected traveling mode, and the engine load factor are shown (see FIG. 12(c)), in response to an operation on the display switching operation member 430.

The control device 100 is configured such that when the PTO ON-OFF operation member 160 receives an ON operation, the control device 100 adds a PTO rotational speed display state in which the vehicle speed, the selected traveling mode, and the PTO rotational speed are shown (see FIG. 12(d)), as a display state of the display switching area.

The operating time of the engine 50 is measured based on the output of a timer provided in the control device 100.

Specifically, the control device 100 detects whether the engine 50 is being operated or not based on a signal from the engine rotational speed sensor 50a, and calculates the cumulative time of the engine rotational speed exceeding a predetermined rotational speed as a total engine operating time.

Also, when a reset signal is input in response to a manual operation on a resetting member 435 (see FIG. 8) provided in the work vehicle, the control device 100 calculates the cumulative time of the engine rotational speed exceeding a predetermined rotational speed after the resetting signal is input, as the post-reset operating time.

The engine load factor is calculated using, for example, relational data between a fuel injection amount and an engine rotational speed stored in advance in the control device 100.

That is, from the actually measured engine rotational speed that is input from the engine rotational speed sensor 50a and the above relational data, the control device 100 obtains a maximum fuel injection amount and a no-load fuel injection amount at that engine rotational speed.

Then, the control device 100 calculates, as the engine load factor, the ratio of the deviation between the actual fuel injection amount and the no-load fuel injection amount to the deviation between the maximum fuel injection amount and the no-load fuel injection amount.

Next, an interposing display function provided in the work vehicle of this embodiment will now be described.

The control device 100 is configured such that when an operation member registered in advance as an interposing display target (hereinafter referred to as a display target operation member) among various operation members provided in the work vehicle is operated, the control device 100 activates an activating member corresponding to the display target operation member and, in addition, shows, in an interposing manner, identification information of the operated operation member and operational information showing the operational state thereof in the liquid crystal display part of the display device.

According to this configuration, an operator can verify the type and the operational status of the operated operation member through the liquid crystal display part and therefore can recognize the operational state and the activating state without directly looking at the operation member and without directly looking at the activating state of the member that is activated in response to the operation on the operation member, and thereby the operability for the operator can be enhanced.

As the liquid crystal display part, the display switching area 425 of the liquid crystal display portion 420 in the instrument panel 400 and/or the liquid crystal display portion in the sub-display 450 can be used.

Figure 13:
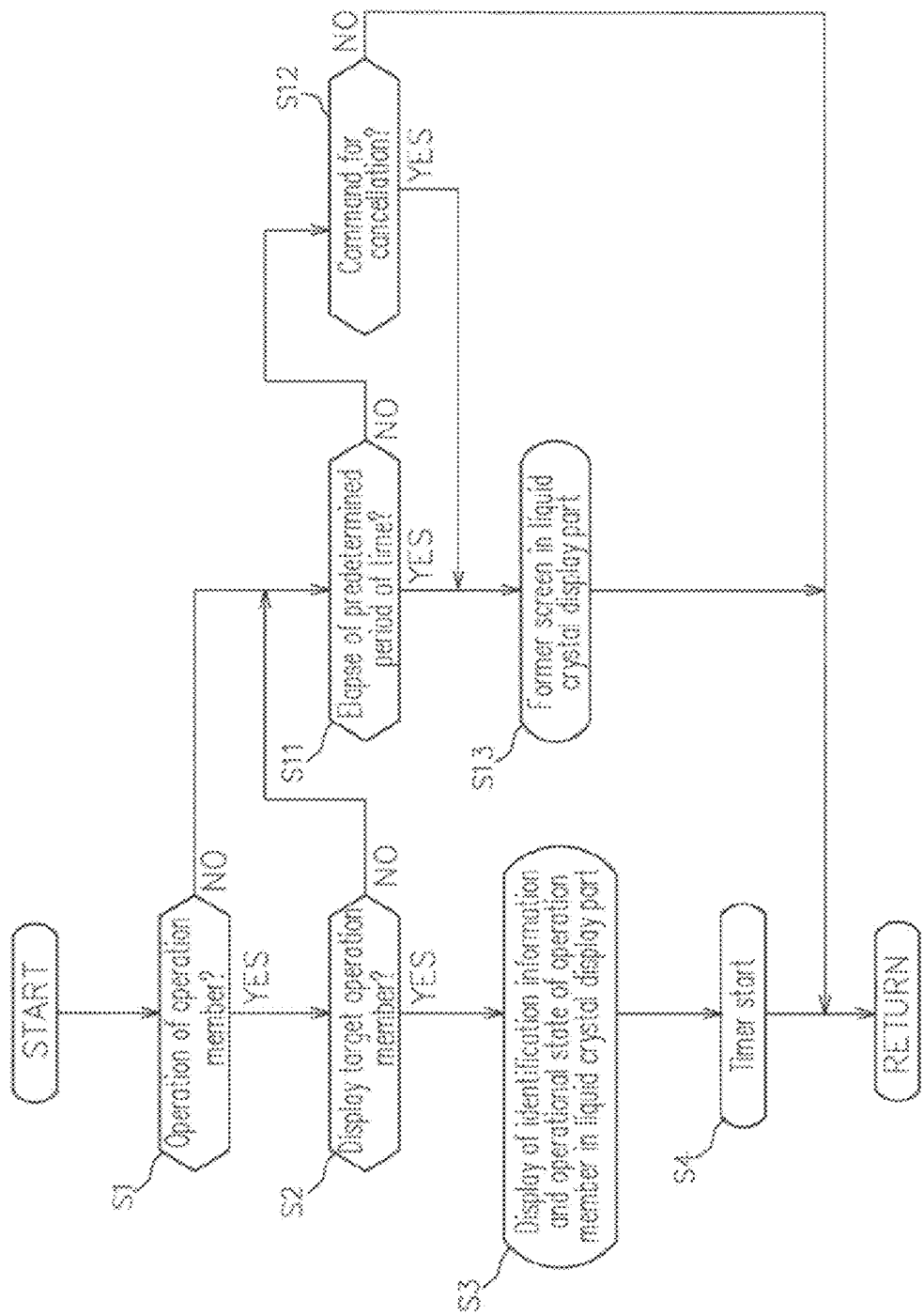
FIG. 13 is a flow chart of interposing display control executed by the control device provided in the work vehicle according to the second embodiment.

FIG. 13 shows a flow of interposing display control.

The control device 100 activates an interposing display control mode in response to the main power supply of the work vehicle being turned on.

The control device 100 detects whether there is an operation of an operation member based on input signals from various sensors (step S1).

In step S1, when detecting any of various operation members being operated, the control device 100 determines whether the operated operation member is a display target operation member that is registered in advance (step S2).

Here, it is possible to configure that the preemptive registration of the display target operation member, for example, can be made by an operator as desired.

That is, as shown in FIG. 8, it is possible to configure that the work vehicle 1 is provided with a display target registering operation member 480 intended for registering the display target operation member, and the control device 100 memorizes the operation member selected by the display target registering operation member 480 as an updated display target operation member.

The information of the display target operation member may be stored, for example, in an EEPROM that keeps it even when the power is turned off and enables rewriting.

According to this configuration, an operator can be appropriately informed of necessary operational information in accordance with various changes of the traveling conditions and the work conditions of the work vehicle 1.

If YES in step S2, or that is, if the operated operation member is a display target operation member, the control device 100 causes the liquid crystal display part to show the identification information of the operated operation member and the operational state of the operation member in an interposing manner (step S3).

Figure 14:
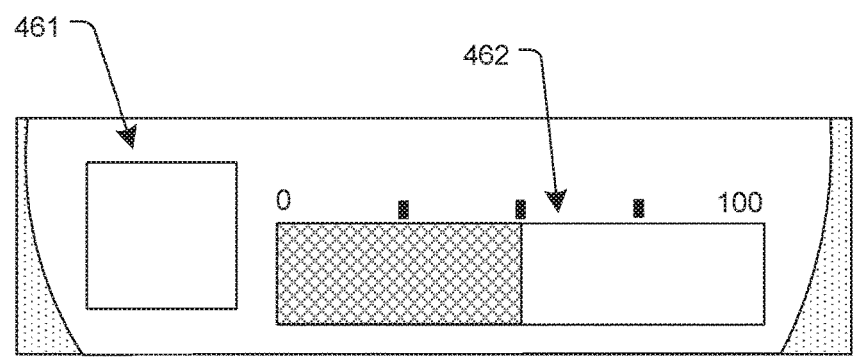
FIG. 14 is a schematic diagram showing one example of interposing display.

FIG. 14 shows an example of interposing display in the liquid crystal display part.

In the example shown in FIG. 14, the identification information of the operation member is shown using a symbol indicating the operation member in an identification information display area 461 in the liquid crystal display part, and as for the operational state, an operable range of the operation member and the current operational position relative to the operable range are indicated in an analog manner in bar graph form in an operational state display area 462.

When the identification information and the operational state of the operation member are shown in the liquid crystal display part in step S3 in an interposing manner, the control device 100 starts counting with a timer (step S4), and returns to step S1.

If NO in step S1 or if NO in step S2, the control device 100 determines whether the time from the beginning of counting (i.e., the time from the beginning of interposing display) in step S4 has elapsed a predetermined period of time (step S11).

If YES in step S11 or, that is, if a predetermined period of time has elapsed since the interposing display, the control device 100 brings the liquid crystal display part back to a previous display state provided before the interposing display (step S13).

If NO in step S11 or, that is, if a predetermined period of time has not elapsed since the interposing display the control device 100 determines whether a manual signal for cancelling the interposing display is input (step S12).

The manual signal for cancelling the interposing display is generated, for example, by a manual operation on an interposing display cancelling member 490 (see FIG. 8) provided in the work vehicle 1.

If YES in step S12 or, that is, if a manual signal for cancelling the interposing display is input, the control device 100 brings the liquid crystal display part back to a previous display state provided prior to the interposing display (step S13).

On the other hand, if NO in step S12, the control device 100 returns to step S1.

Third Embodiment

Below, another embodiment of the work vehicle of the present invention will now be described with reference to the appended drawings.

In this embodiment, the same components as those in the first embodiment are given the same reference numbers, and descriptions thereof are omitted as appropriate.

The work vehicle of this embodiment is configured to be capable of efficiently informing an operator of information that the operator wishes to know and that changes in accordance with the traveling conditions and the work conditions.

That is, in a work vehicle such as a tractor, providing a liquid crystal display in an instrument panel having a tachometer that shows the rotational speed of an engine and various indicator lamps is proposed (see, for example, JP 2010-172267A).

Specifically, in the above conventional work vehicle, the liquid crystal display has a main speed-changing stage display area that shows the speed-changing stages of a main transmission, an auxiliary speed-changing stage display area that shows the speed-changing stages of an auxiliary transmission, a forward-reverse display area that shows the activating state of a forward-reverse switching device, a height display area that shows the vertical oscillation angle of an attached working device, and, in addition to these, an information display area.

The information display area is configured to sequentially switch between a total engine operating time display state, a post-reset operating time display state, an instant fuel efficiency display state, an average fuel efficiency display state, and a fuel usage display state in response to an operation on a display selector switch.

By selectably showing multiple information items in the information display area, the above conventional work vehicle is capable of informing an operator of various information items without the need of a large liquid crystal display.

However, in the above conventional work vehicle, the information shown in the information display area is limited to the predetermined five items above.

On the other hand, the information that an operator wishes to know variously changes in accordance with the traveling conditions and the work conditions.

In this regard, the above conventional work vehicle has room for improvement.

In the above conventional work vehicle, although the aforementioned five information items are shown in the information display area, these are not shown simultaneously (in parallel), but selected items are shown one at a time, and thus there is room for improvement from the viewpoint of presentation as well.

The work vehicle of this embodiment can more efficiently inform an operator of information items that the operator wishes to know and that change in accordance with the traveling conditions and the work conditions than the above conventional work vehicle.

Figure 15:
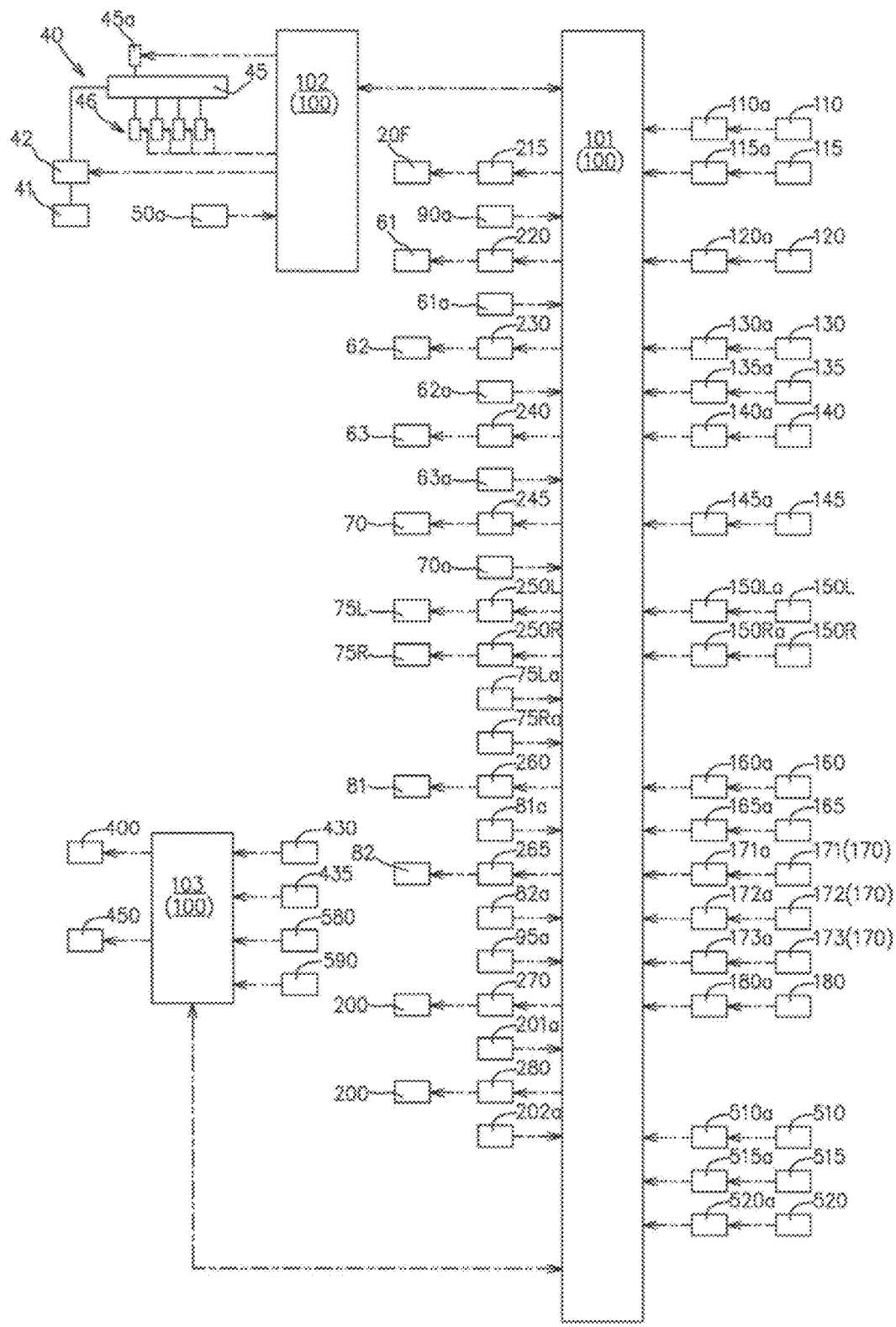
FIG. 15 is a control block diagram in a work vehicle according to a third embodiment of the present invention.

FIG. 15 shows a control block diagram in the work vehicle of this embodiment.

The control device 100 is configured to simultaneously show on the sub-display 450 one or more information items selected as desired by the operator among a plurality of information items concerning the activating state and the setting state of the work vehicle and the information values of the information items.

Specifically as shown in FIG. 15, the work vehicle 1 is provided with a display item selecting operation member 580 that can be manually operated, and the control device 100 stores, as items to be shown, one or more information items selected as desired through the display item selecting operation member 580 among the plurality of information items, and shows the information items stored as items to be shown and the information values of the information items simultaneously on the sub-display 450.

The plurality of information items include the travelling speed (the vehicle speed), the PTO rotational speed, the engine rotational speed, the engine load factor, the engine rotational speed upper limit value and the maximum vehicle speed value in each of the plurality of traveling modes, and the currently selected traveling mode.

Figure 16:
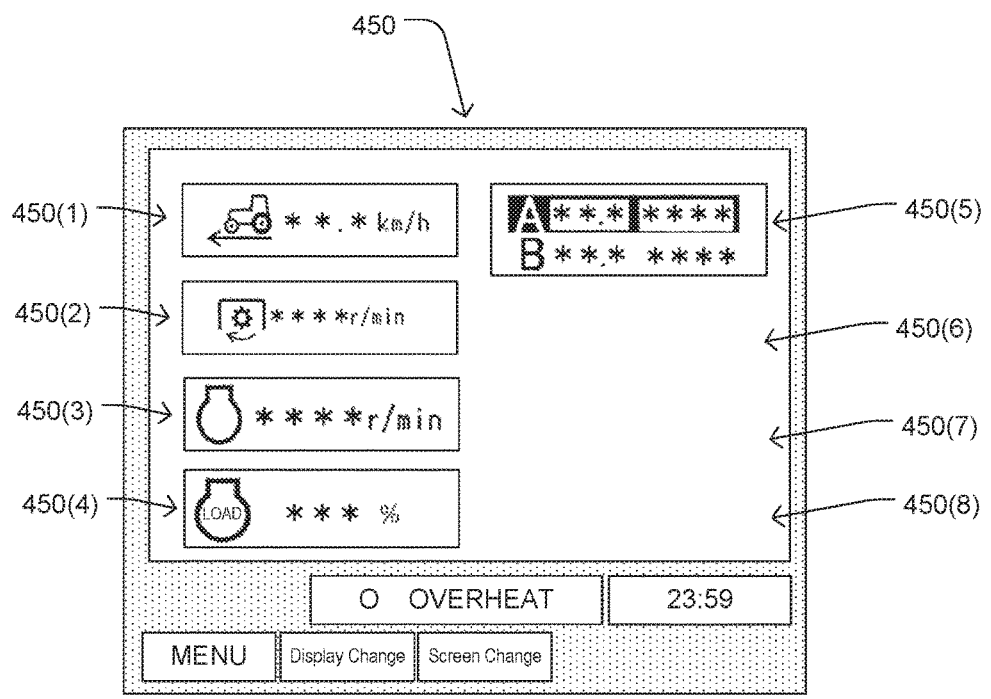
FIG. 16 is a schematic diagram of one example of an information display screen of a sub-display provided in the work vehicle according to the third embodiment.

FIG. 16 shows an example of the information display screen of the sub-display 450.

In the example shown in FIG. 16, the information display screen of the sub-display 450 has first to eighth display areas 450(1) to 450(8), and the travelling speed (the vehicle speed), the PTO rotational speed, the engine rotational speed, the engine load factor, and a plurality of traveling modes are shown in the first to fifth display areas 450(1) to 450(5), respectively.

Preferably, every time a selecting operation is performed through the display item selecting operation member 580, the control device 100 can store, as items to be displayed, one or more information items selected through the most recent selecting operation in an EEPROM that keeps information even when power is turned off and enables rewriting.

According to this configuration, it is possible to efficiently show an operator necessary information that changes in accordance with the used conditions of the work vehicle 1 used.

Moreover, preferably, the control device 100 can be configured such that when one of the engine rotational speed and the PTO rotational speed is selected as an item to be displayed, the other is automatically included as an item to be displayed.

That is, the control device 100 can cause the sub-display 450 to simultaneously show the engine rotational speed and the PTO rotational speed as a set.

According to this configuration, the PTO rotational speed and the engine rotational speed can be visually compared, and, thereby, the loaded state of the working device 200 driven by the PTO shaft 95 can be easily recognized.

Preferably, the control device 100 can be configured such that when one of the engine load factor and the traveling mode information is selected as an item to be displayed, the other is automatically included as an item to be displayed.

That is, the control device 100 can cause the sub-display 450 to simultaneously show the engine load factor and the traveling mode information as a set.

According to this configuration, the engine rotational speed upper limit value and the maximum vehicle speed value in each of the plurality of traveling modes and the currently selected traveling mode can be checked while recognizing the engine load factor, and, therefore, it is possible to easily determine which traveling mode should be selected among the plurality of traveling modes (that is, determine whether the currently selected traveling mode is appropriate, and, if not appropriate, which traveling mode is most suitable).

For example, it is possible to configure the work vehicle 1 to be provided with a display mode selecting operation member 590 (see FIG. 15) that can be manually operated, and the control device 100 in response to an operation to shift to an information display mode through the display mode selecting operation member 590, changes the screen of the sub-display 450 from a home screen to an information item selection screen on which the plurality of information items are listed, and stores information items selected among the plurality of information items listed on the display item selection screen through the display item selecting operation member 580 as items to be displayed.

According to this configuration, the operability when selecting items to be displayed from the plurality of information items can be enhanced.

In this case, the display item selecting operation member 580 and the display mode selecting operation member 590 can be formed as a single rotary switch (not shown) that can be rotated and pressed.

That is, the control device 100 can cause the home screen of the sub-display 450 to show a plurality of icons including an icon for the information display mode, a cursor to be sequentially moved to the plurality of icons in response to a rotational operation on the rotary switch, and the information display mode to be reached when the cursor is placed on the information display mode icon and then the rotary switch is pressed.

In the information display mode, the control device 100 causes the sub-display 450 to show an information item selection screen as an initial screen where the plurality of information items are listed and, in response to a rotational operation on the rotary switch in this state, the cursor to be sequentially moved to the plurality of information items.

Then, when the cursor is placed on one information item and then the rotary switch is pressed, this information item is stored as an item to be displayed, and in response to a display item selecting operation terminating command, the sub-display 450 switches from the information item selection screen to an information display screen (see FIG. 16) where the information item selected as an item to be displayed and the information value of this information item are simultaneously shown.

The display item selecting operation terminating command may be generated by for example, causing an icon indicating the end of selection to be displayed in addition to the plurality of information items on the information item selection screen, and placing the cursor on the icon and pressing the rotary switch.

Also, it is possible to cause the information display screen to show an icon for returning to the information item selection screen and/or an icon for returning to the home screen, and shift to the information item selection screen or the home screen from the information display screen in response to a manual operation on the rotary switch.

DESCRIPTION OF THE REFERENCE NUMERALS 1 work vehicle
40 fuel injection device
50 engine
61 HST (traveling-system transmission)
81 PTO clutch
82 PTO transmission
95 PTO shaft
95a PTO rotation sensor
100 control device
110 engine rotational speed changing operation member
120 main speed changing operation member (traveling-system speed changing operation member)
160 PTO ON-OFF operation member
165 PTO speed changing operation member
400 instrument panel (display device)
430 display switching operation member
450 sub-display (display device)
510 engine rotational speed upper limit setting member
520 traveling-mode switching operation member

The invention claimed is:

1. A work vehicle, comprising:
an engine configured to output power that has a rotational speed corresponding to an operation on an engine rotational speed changing operation member;
a traveling-system transmission disposed in a traveling-system power transmission path from the engine to travel members and configured to perform a speed change action corresponding to an operation on a traveling-system speed changing operation member;
a multi-stage power take off (PTO) transmission disposed in a working-system power transmission path from the engine to a PTO shaft and configured to perform a speed change action corresponding to an operation on a PTO speed changing operation member; and
a display device having a liquid crystal display part and a control device,
wherein the control device is configured to:
calculate, for each of a plurality of speed-changing stages in the PTO transmission, an expected maximum rotational speed of PTO rotary power that is output from the PTO shaft when the engine rotational speed changing operation member is operated to a maximum extent, and
show the calculated results, so as to correspond to each of the plurality of speed-changing stages, in the liquid crystal display part in a listed manner.

2. The work vehicle according to claim 1, further comprising:
an engine rotational speed upper limit setting member and a traveling-mode switching operation member,
wherein:
the control device is configured to store a plurality of engine rotational speed upper limit values that are set by the engine rotational speed upper limit setting member; and
the control device is configured such that, in a state in which an output rotational speed of the engine when the engine rotational speed changing operation member is operated to a maximum extent is limited to one engine rotational speed upper limit value that is made effective by the traveling-mode switching operation member:
the control device activates and controls a fuel injection device that supplies fuel to the engine to cause an output rotational speed of the engine to arrive at a rotational speed corresponding to an amount of operation on the engine rotational speed changing operation member; and
the control device calculates the expected maximum rotational speed of PTO rotary power for each speed-changing stage in the PTO transmission based on the effective engine rotational speed upper limit.

3. The work vehicle according to claim 1, further comprising:
a PTO clutch that is disposed in the working-system power transmission path and is configured to connect or disconnect power from the engine to the PTO shaft in response to an operation on a PTO ON-OFF operation member,
wherein, when the PTO ON-OFF operation member is operated for ON, the control device is configured to cause the liquid crystal display part to shift to a PTO rotational speed display screen that shows the expected maximum rotational speeds of PTO rotational power of respective speed-changing stages in the PTO transmission in a listed manner.

4. The work vehicle according to claim 1, further comprising:
a display switching operation member that is capable of being manually operated,
wherein, in response to a predetermined operation on the display switching operation member, the control device causes the liquid crystal display part to shift to a PTO rotational speed display screen that shows the expected maximum rotational speeds of PTO rotational power of respective speed-changing stages in the PTO transmission in a listed manner.

5. The work vehicle according to claim 1, further comprising:
a PTO rotational speed sensor that detects an actual rotational speed of the PTO shaft, wherein
the control device causes the liquid crystal display part to also show the actual rotational speed of the PTO shaft based on the PTO rotational speed sensor when showing the expected maximum rotational speeds of PTO rotational power of respective speed-changing stages in the PTO transmission.

6. A work vehicle, comprising:
an engine rotational speed changing operation member;
an engine configured to have a rotational speed corresponding to an operation on the engine rotational speed changing operation member;
a multi-stage power take off (PTO) transmission disposed in a working-system power transmission path from the engine to a PTO shaft and configured to perform a speed change action corresponding to an operation on a PTO speed changing operation member; and
a control device configured to calculate a plurality of expected maximum rotational speed values, the plurality of expected maximum rotational speed values include, for each of a plurality of speed-changing stages in the PTO transmission, a corresponding expected maximum rotational speed of PTO rotary power that is expected to be output from the PTO shaft responsive to maximum operation of the engine rotational speed changing operation member, and a display device configured to concurrently display each value of the plurality of expected maximum rotational speed values.

7. A work vehicle, comprising:

an engine rotational speed changing operation member;

an engine configured to have a rotational speed corresponding to an operation on the engine rotational speed changing operation member;

a multi-stage power take off (PTO) transmission disposed in a working-system power transmission path from the engine to a PTO shaft and configured to perform a speed change action corresponding to an operation on a PTO speed changing operation member; and a display device configured to concurrently display each value of a plurality of expected maximum rotational speed values, wherein the plurality of expected maximum rotational speed values include, for each of a plurality of speed-changing stages in the PTO transmission, a corresponding expected maximum rotational speed of PTO rotary power that is expected to be output from the PTO shaft responsive to maximum operation of the engine rotational speed changing operation member.

* * * * *